(12) United States Patent
Seno et al.

(10) Patent No.: US 9,323,138 B2
(45) Date of Patent: Apr. 26, 2016

(54) IMAGE OUTPUT DEVICE, IMAGE OUTPUT METHOD, AND PROGRAM

(71) Applicant: Sony Corporation, Tokyo (JP)

(72) Inventors: Katsunori Seno, Kanagawa (JP); Naotaka Osawa, Kanagawa (JP); Tomotaka Miyashiro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 238 days.

(21) Appl. No.: 14/025,462

(22) Filed: Sep. 12, 2013

(65) Prior Publication Data

US 2014/0092369 A1    Apr. 3, 2014

(30) Foreign Application Priority Data

Sep. 28, 2012  (JP) .................. 2012-216649

(51) Int. Cl.
| | |
|---|---|
| G02B 26/10 | (2006.01) |
| G03B 21/14 | (2006.01) |
| G03B 21/28 | (2006.01) |
| G03B 21/20 | (2006.01) |
| G03B 33/06 | (2006.01) |
| H04N 9/31 | (2006.01) |

(52) U.S. Cl.
CPC ............. *G03B 21/147* (2013.01); *G02B 26/10* (2013.01); *G03B 21/2033* (2013.01); *G03B 21/28* (2013.01); *G03B 33/06* (2013.01); *H04N 9/3129* (2013.01); *H04N 9/3185* (2013.01); *H04N 9/3194* (2013.01)

(58) Field of Classification Search
USPC .................. 353/69, 70, 98; 359/196.1, 201.1, 359/204.1, 204.4
See application file for complete search history.

(56) References Cited

U.S. PATENT DOCUMENTS

| | | | | |
|---|---|---|---|---|
| 8,142,029 | B2 * | 3/2012 | Matsumoto et al. | 353/69 |
| 8,159,760 | B2 * | 4/2012 | Kubota | 359/697 |
| 8,911,094 | B2 * | 12/2014 | Furui | 353/70 |
| 2006/0017890 | A1 * | 1/2006 | Inazumi | 353/69 |
| 2013/0021585 | A1 * | 1/2013 | Tamura | 353/69 |
| 2014/0092151 | A1 * | 4/2014 | Seno et al. | 345/698 |

FOREIGN PATENT DOCUMENTS

JP    2011-205524    10/2011

* cited by examiner

*Primary Examiner* — William C Dowling
(74) *Attorney, Agent, or Firm* — Michael Best & Friedrich LLP

(57) ABSTRACT

There is provided an image output device including a projectable region calculating unit that calculates a projectable region which is a region on a screen in which laser beam is projectable based on a trajectory in which scanning with the laser beam is performed using information specifying the screen onto which an image is projected by two-dimensional scanning with the laser beam, a projection window setting unit that causes the laser beam to be emitted and sets a projection window serving as a range in which the image is projected in the projectable region, and a generating unit that generates a pixel value of each of positions corresponding to pixels included in the image within the projection window on the screen for each pixel in a manner that the image is projected in the range set by the projection window.

20 Claims, 17 Drawing Sheets

FIG. 3
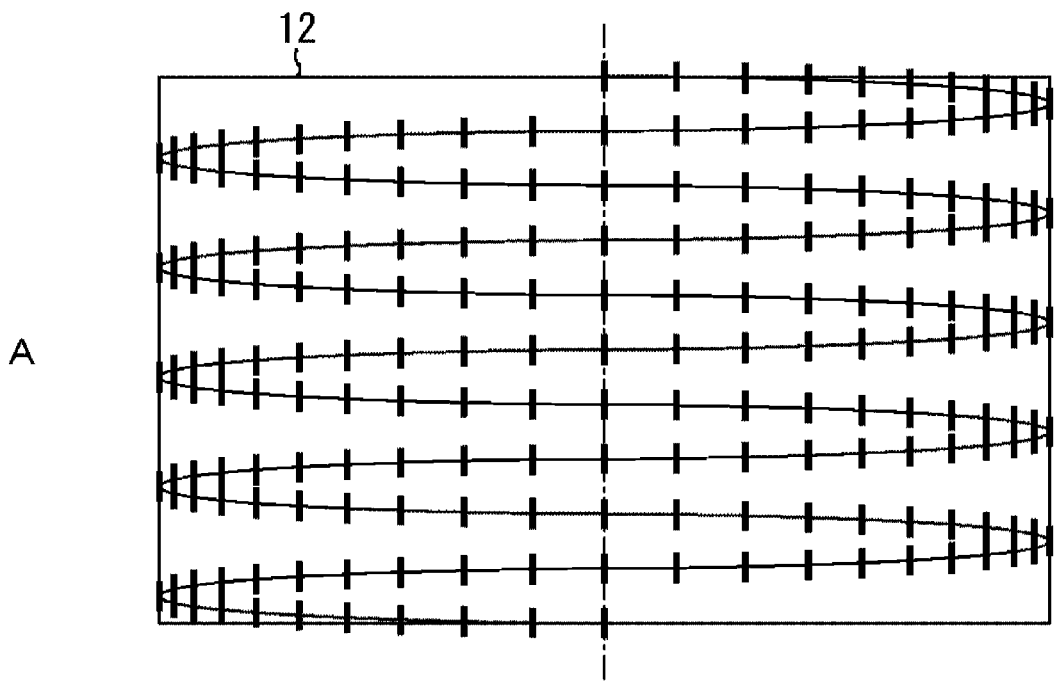
A
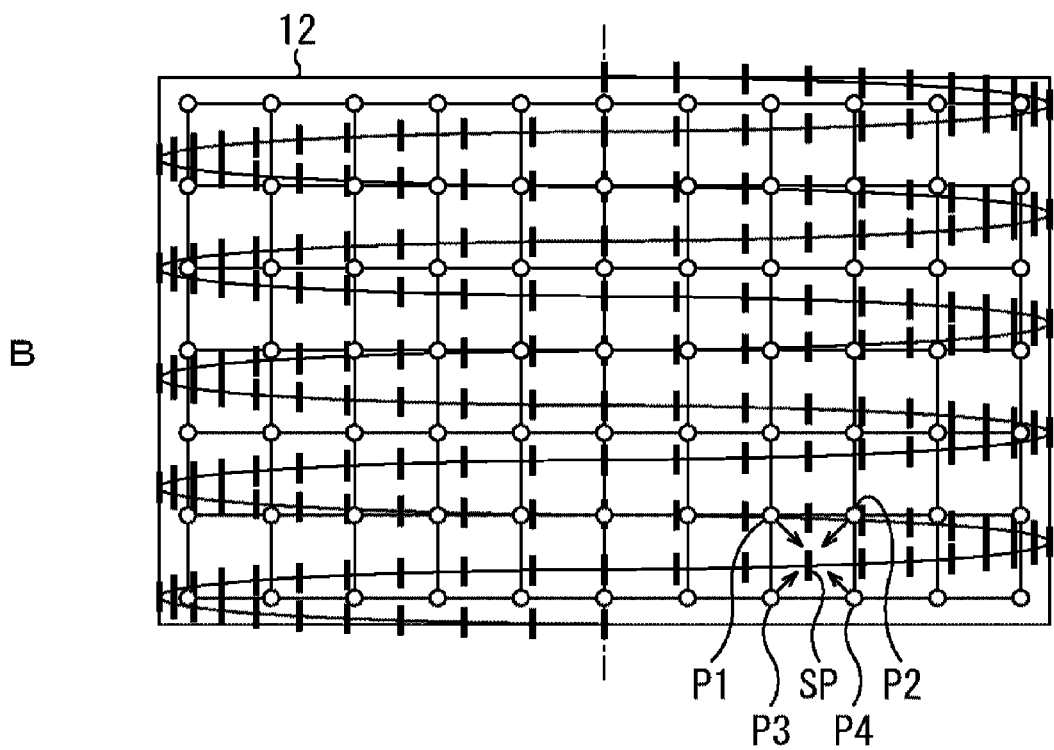
B

FIG. 11
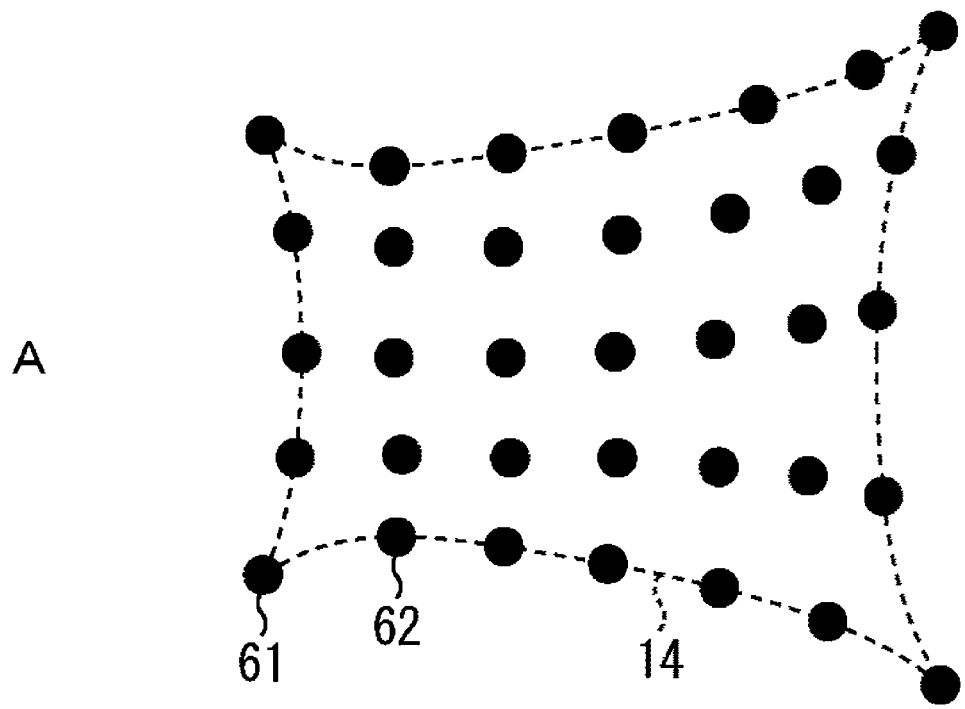
A
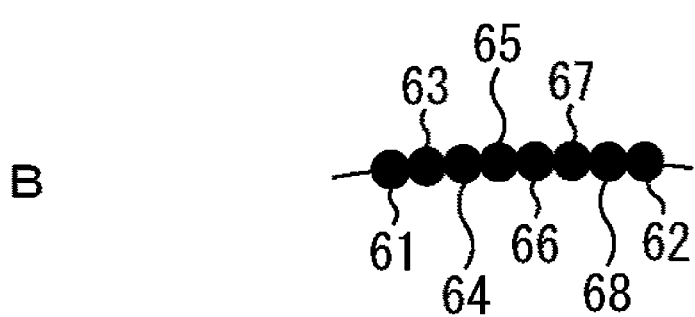
B

US 9,323,138 B2

IMAGE OUTPUT DEVICE, IMAGE OUTPUT METHOD, AND PROGRAM

BACKGROUND

The present disclosure relates to an image output device, an image output method, and a program, and more particularly to an image output device, an image output method, and a program, which are capable of more appropriately correcting distortion of an image to be projected and outputting the corrected image.

Generally, projection devices that project an image onto a screen use a halogen lamp or a light emitting diode (LED) as a light source.

In the past, when projection devices are installed in front of a screen, although it is possible to project an image having no distortion onto the screen, an image to be projected onto the screen may be distorted in the form of a trapezoid depending on an installation angle of the projection device. For this reason, projection devices with a function of correcting trapezoidal distortion of an image have been used.

For example, a projection device capable of easily and appropriately adjusting the position of an image that has been subjected to trapezoidal distortion correction is disclosed in JP 2011-205524 A.

SUMMARY

Meanwhile, a projection device using a laser source projects an image by performing scanning while driving a micro mirror at a high speed to reflect laser beams, and thus distortion different from the trapezoidal distortion occurs in an image to be projected onto the screen. Since this distortion is decided according to a positional relation of components of an optical path from the laser source to the screen and physical driving operation characteristics of the mirror, it is difficult to appropriately correct distortion compared to correction of the trapezoidal distortion.

It is desirable to more appropriately correct distortion of an image to be projected and output the corrected image.

According to an embodiment of the present disclosure, there is provided an image output device including a projectable region calculating unit that calculates a projectable region which is a region on a screen in which laser beam is projectable based on a trajectory in which scanning with the laser beam is performed using information specifying the screen onto which an image is projected by two-dimensional scanning with the laser beam, a projection window setting unit that causes the laser beam to be emitted and sets a projection window serving as a range in which the image is projected in the projectable region, and a generating unit that generates a pixel value of each of positions corresponding to pixels included in the image within the projection window on the screen for each pixel in a manner that the image is projected in the range set by the projection window.

According to an embodiment of the present disclosure, there is provided an image output method including calculating a projectable region which is a region on a screen in which laser beam is projectable based on a trajectory in which scanning with the laser beam is performed using information specifying the screen onto which an image is projected by two-dimensional scanning with the laser beam, causing the laser beam to be emitted and setting a projection window serving as a range in which the image is projected in the projectable region, and generating a pixel value of each of positions corresponding to pixels included in the image within the projection window on the screen for each pixel in a manner that the image is projected in the range set by the projection window.

According to an embodiment of the present disclosure, a projectable region which is a region on a screen in which laser beam is projectable is calculated based on a trajectory in which scanning with the laser beam is performed using information specifying the screen onto which an image is projected by two-dimensional scanning with the laser beam. The laser beam is caused to be emitted and a projection window serving as a range in which the image is projected in the projectable region is set. A pixel value of each of positions corresponding to pixels included in the image within the projection window on the screen for each pixel is generated in a manner that the image is projected in the range set by the projection window.

According to the embodiments of the present technology described above, it is possible to more appropriately correct distortion of an image to be projected and output a corrected image.

BRIEF DESCRIPTION OF THE DRAWINGS

FIGS. 3A and 3B are diagrams illustrating a relation between a scanning trajectory of laser beams and a pixel array conforming to an image signal standard;

FIGS. 11A and 11B are diagrams for describing a method of discretely calculating a rendering pixel position;

DETAILED DESCRIPTION OF THE EMBODIMENT(S)

Figure 1:
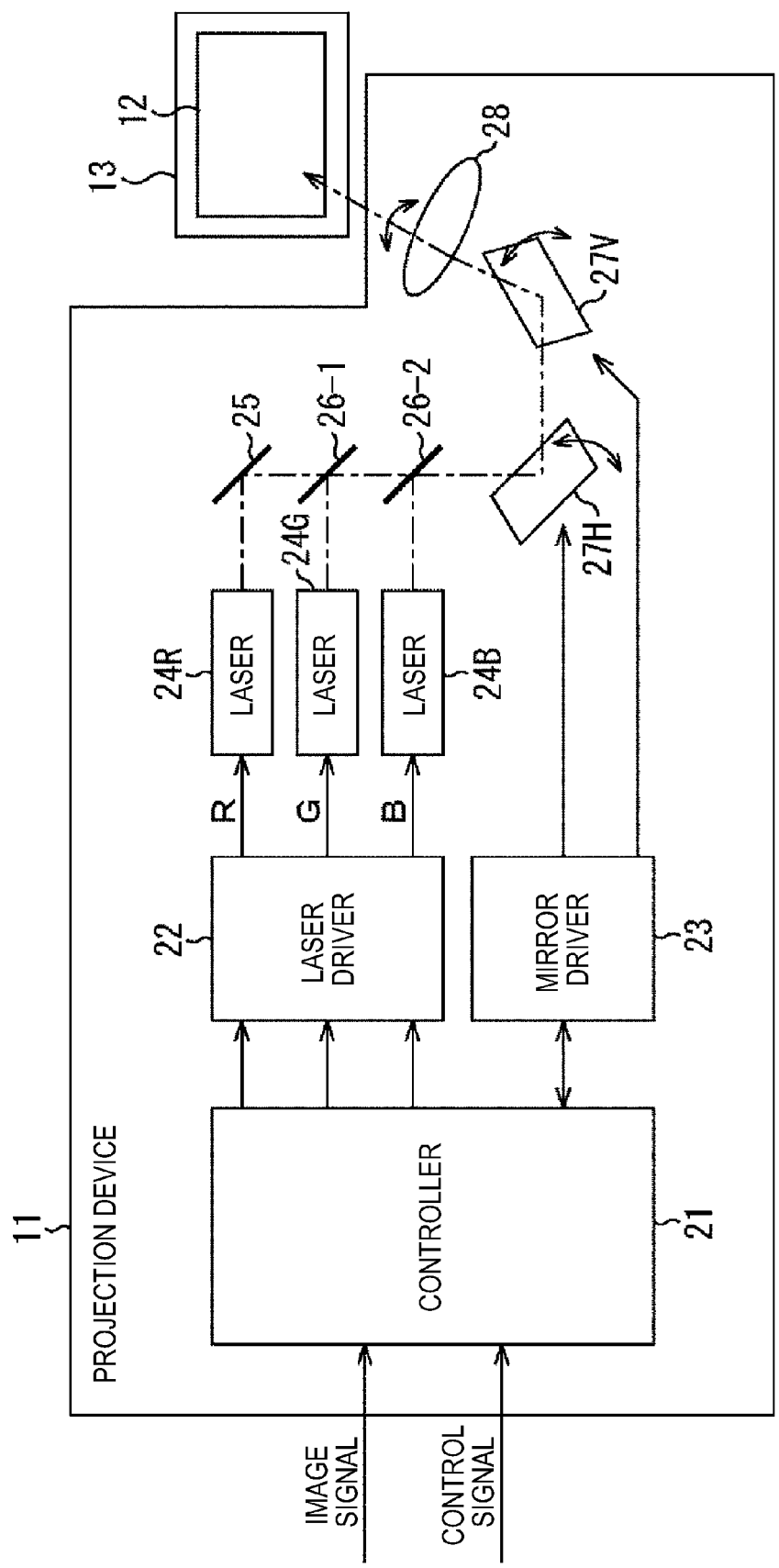
FIG. 1 is a block diagram illustrating an exemplary configuration of a projection device according to an embodiment of the present technology.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, exemplary embodiments of the present technology will be described in detail with reference to the accompanying drawings.

FIG. 1 is a block diagram illustrating an exemplary configuration of a projection device according to an embodiment of the present technology.

Referring to FIG. 1, a projection device 11 projects an image 12 in which a laser beam is used as a light source onto a screen 13. The projection device 11 includes a controller 21, a laser driver 22, a mirror driver 23, laser sources 24R, 24G, and 24B, a mirror 25, dichroic mirrors 26-1 and 26-2, scanning mirrors 27H and 27V, and an optical lens 28.

The controller 21 generates an image signal of three primary colors (red, green, and blue) rendering the image 12 based on an image signal supplied from an image reproducing device (not shown), and supplies the image signal to the laser driver 22 based on a synchronous signal of a mirror supplied from the mirror driver 23. Further, the controller 21 is supplied with a control signal from a host controller (not shown) and performs control according to the control signal. A detailed configuration of the controller 21 will be described later with reference to FIG. 4.

The laser driver 22 generates driving signals according to pixel values of pixels of the image 12 for the respective colors of the image signal based on the image signal supplied from the controller 21, and supplies the driving signals to the laser sources 24R, 24G, and 24B. For example, the laser driver 22 supplies a driving signal according to a red pixel value of the image signal to the laser source 24R, supplies a driving signal according to a green pixel value of the image signal to the laser source 24G, and supplies a driving signal according to a blue pixel value of the image signal to the laser source 24B.

The mirror driver 23 generates a horizontal scan signal based on a resonant frequency of the scanning mirror 27H in order to perform laser beam scanning in a horizontal direction of the image 12, and supplies the horizontal scan signal to the scanning mirror 27H. Further, the mirror driver 23 generates a vertical scan signal for performing laser beam scanning in a vertical direction of the image 12, and supplies the vertical scan signal to the scanning mirror 27V. The mirror driver 23 includes a light receiving unit that detects a part of the laser beams reflected by the scanning mirrors 27H and 27V. The mirror driver 23 adjusts the horizontal scan signal and the vertical scan signal based on the output result of the light receiving unit or feeds a detection signal according to the output result of the light receiving unit back to the controller 21.

The laser sources 24R, 24G, and 24B output laser beams of corresponding colors according to the driving signals supplied from the laser driver 22, respectively. For example, the laser source 24R outputs a red laser beam at a level according to the red pixel value of the image signal. Similarly, the laser source 24G outputs a green laser beam at a level according to the green pixel value of the image signal, and the laser source 24B outputs a blue laser beam at a level according to the blue pixel value of the image signal.

The mirror 25 reflects the red laser beam output from the laser source 24R. The dichroic mirror 26-1 reflects the green laser beam output from the laser source 24G and transmits the red laser beam reflected by the mirror 25. The dichroic mirror 26-2 reflects the blue laser beam output from the laser source 24B and transmits the red laser beam reflected by the mirror 25 and the green laser beam reflected by the dichroic mirror 26-1. The mirror 25 and the dichroic mirrors 26-1 and 26-2 are assembled and arranged so that the optical axes of the laser beams output from the laser sources 24R, 24G, and 24B become coaxial.

For example, the scanning mirrors 27H and 27V are micro mirrors formed by micro electro mechanical systems (MEMSs) and are driven according to the horizontal scan signal and the vertical scan signal supplied from the mirror driver 23. For example, the scanning mirror 27H is driven to reflect the laser beams output from the laser sources 24R, 24G, and 24B and perform laser beam scanning in the horizontal direction of the image 12. The scanning mirror 27V is driven to reflect the laser beams output from the laser sources 24R, 24G, and 24B and perform laser beam scanning in the vertical direction of the image 12.

The optical lens 28 is arranged on the optical path of the laser beams between the scanning mirror 27V and the screen 13, and corrects the optical path of the laser beams.

The projection device 11 may employ a configuration in which the laser driver 22 and the mirror driver 23 are integrated into the controller 21. Further, the projection device 11 may have a configuration in which the optical lens 28 is not arranged on the optical path of the laser beams.

The projection device 11 has the above-described configuration, and projects the two-dimensional (2D) image 12 onto the screen 13 such that the scanning mirrors 27H and 27V perform the laser beam scanning in the directions orthogonal to each other. For example, either of a raster scan and a Lissajous scan may be employed as the laser beam scan method by the scanning mirrors 27H and 27V, but the raster scan is employed in the projection device 11.

The raster scan will be described with reference to FIG. 2.

Figure 2:
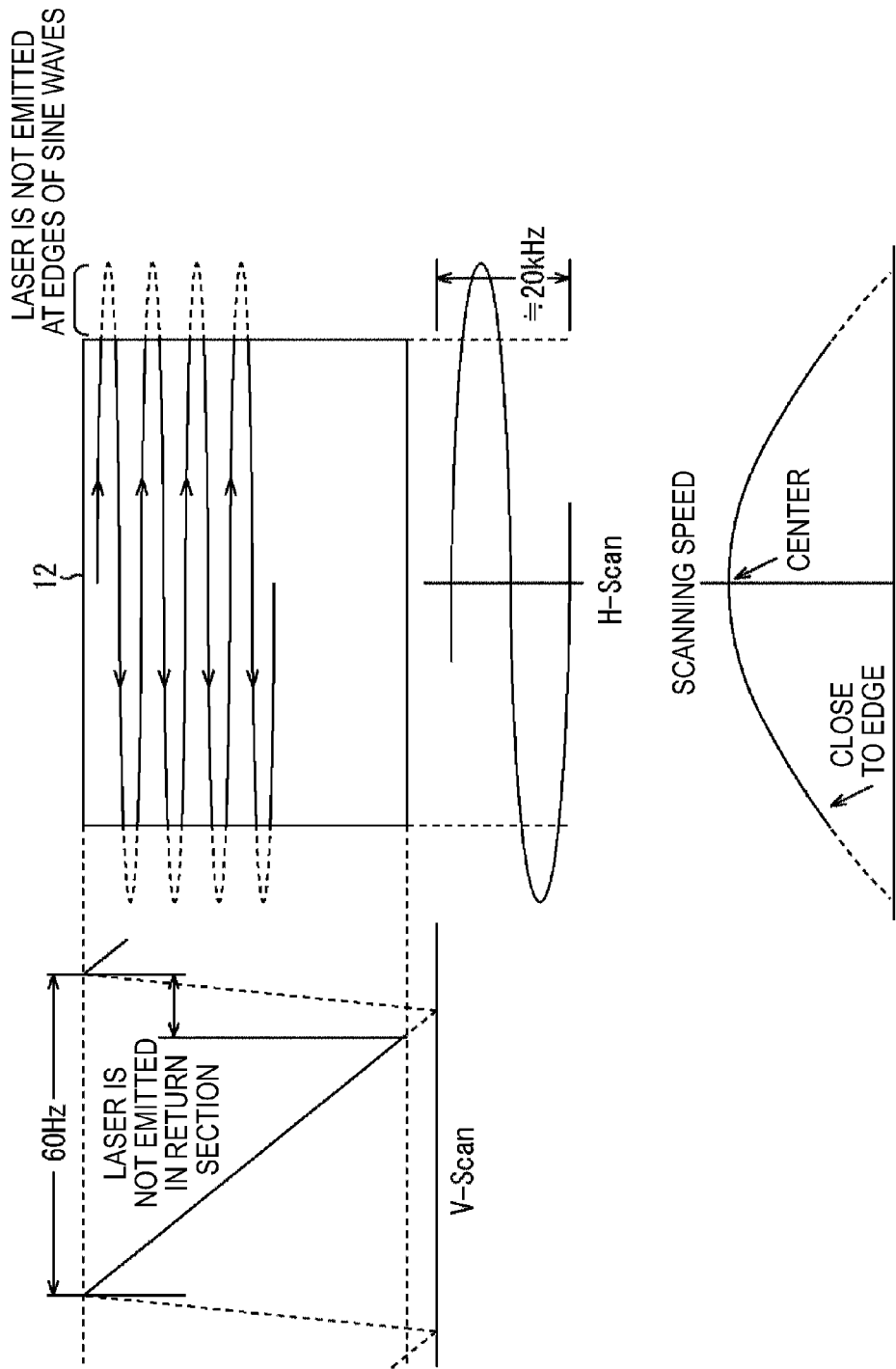
FIG. 2 is a diagram for describing a raster scan by a projection device.

Referring to FIG. 2, the scanning trajectory of the laser beams by the raster scan is illustrated on the image 12, a horizontal scan signal H-Scan is illustrated below the image 12, and a vertical scan signal V-Scan is illustrated at the left of the image 12.

For example, the horizontal scan signal H-Scan is a signal having a waveform of a sine wave that resonates at about 20 kHz according to the resonant frequency of the scanning mirror 27H, and the frequency of the horizontal scan signal H-Scan is half the horizontal synchronous frequency of the image 12. For example, the vertical scan signal V-Scan is a signal having a waveform of a saw-tooth wave that resonates at about 60 Hz which is the frequency corresponding to the frame period of the image 12.

In the scanning trajectory near both ends of the horizontal scan signal H-Scan, the laser is not emitted, and turned-back portions of the scanning trajectory are not used in projecting the image 12. Further, in return sections which are sections of a waveform in which the vertical scan signal V-Scan rises substantially perpendicularly, that is, sections in which the scanning trajectory of the laser beams steeply changes upward, the laser is not emitted.

As the scanning mirrors 27H and 27V are driven according to the horizontal scan signal H-Scan and the vertical scan signal V-Scan, respectively, scanning with the laser beams is performed along the scanning trajectory indicated on the image 12. Since scanning with the laser beams is performed in the two directions as illustrated in FIG. 2, that is, since the scanning direction of the laser beams changes in units of rows of scanning lines in the horizontal direction, it is necessary to perform a process of sorting the image signals or change a data access direction in units of rows of scanning lines in the projection device 11.

Further, as illustrated below the horizontal scan signal H-Scan, the scanning speed of the laser beams is high in the center of the image 12 but decreases as it is closer to the edge of the image 12. This is considered to cause non-uniform brightness in the image 12, and thus the projection device 11 performs an adjustment of lowering laser output and making brightness uniform in the vicinity of the edge of the image 12. Similarly, the projection device 11 may adjust the rate of the image signal rate as necessary.

In addition, since scanning with the laser beams is performed according to the sine wave, intervals between scanning lines extending in the horizontal direction become non-uniform. Generally, in the image signal standard, an image is configured with a pixel array in which pixels are arranged in the form of a lattice, and thus when an image signal conforming to the image signal standard is output according to the scanning trajectory of the laser beams according to the sine wave, deviation occurs in each pixel in the image 12.

A relation between the scanning trajectory of the laser beams and the pixel array conforming to the image signal standard will be described with reference to FIGS. 3A and 3B.

FIG. 3A illustrates the scanning trajectory of the laser beams, and FIG. 3B illustrates the scanning trajectory of the laser beams and the pixel array conforming to the image signal standard in an overlapping manner.

In FIGS. 3A and 3B, rectangular dots arranged on the scanning trajectory of the laser beams at predetermined pitches represent scan pixels in which the sine wave-like trajectory of the horizontal scan signal H-Scan is engraved with video clocks synchronized with the horizontal scan signal H-Scan. In other words, the scan pixel represents a spot which is irradiated with the laser beam according to a video clock.

As described above with reference to FIG. 2, the scanning speed of the laser beams is high in the center of the image 12 and decreases as it is closer to the edge of the image 12, and intervals between scanning lines extending in the horizontal direction are non-uniform. For this reason, as illustrated in FIG. 3A, the scan pixels are sparsely arranged in the center of the image 12 but densely arranged in the vicinity of the edge thereof, and the intervals between the scan pixels in the vertical direction are non-uniform.

In FIG. 3B, circular dots arranged in the form of a lattice represent pixels arranged with the pixel array conforming to the image signal standard. As illustrated in FIG. 3B, the scan pixel array according to the scanning trajectory of the laser beams is significantly different from the pixel array according to the image signal standard and thus non-uniform in timing. For this reason, when the image 12 is projected, deviation occurs in each pixel.

In this regard, in the projection device 11, the occurrence of deviation in each pixel of the image 12 can be avoided by performing an interpolation process of generating a pixel value according to the scan pixel array based on pixel values of pixel signals of a plurality of pixels.

For example, a scan pixel SP illustrated in FIG. 3B will be described. In the projection device 11, a process of generating pixel values of the scan pixels SP based on pixel values of 4 pixels P1 to P4 near the scan pixel SP through 2D interpolation corresponding to the position of the scan pixel SP is performed. This process is performed on all of the scan pixels, and thus the occurrence of deviation in each pixel of the image 12 is avoided. A pattern of selecting a pixel used to generate a pixel value of the scan pixel SP is not limited to the 4 pixels P1 to P4 illustrated in FIG. 3B, and various patterns of selecting more pixels may be used.

Figure 4:
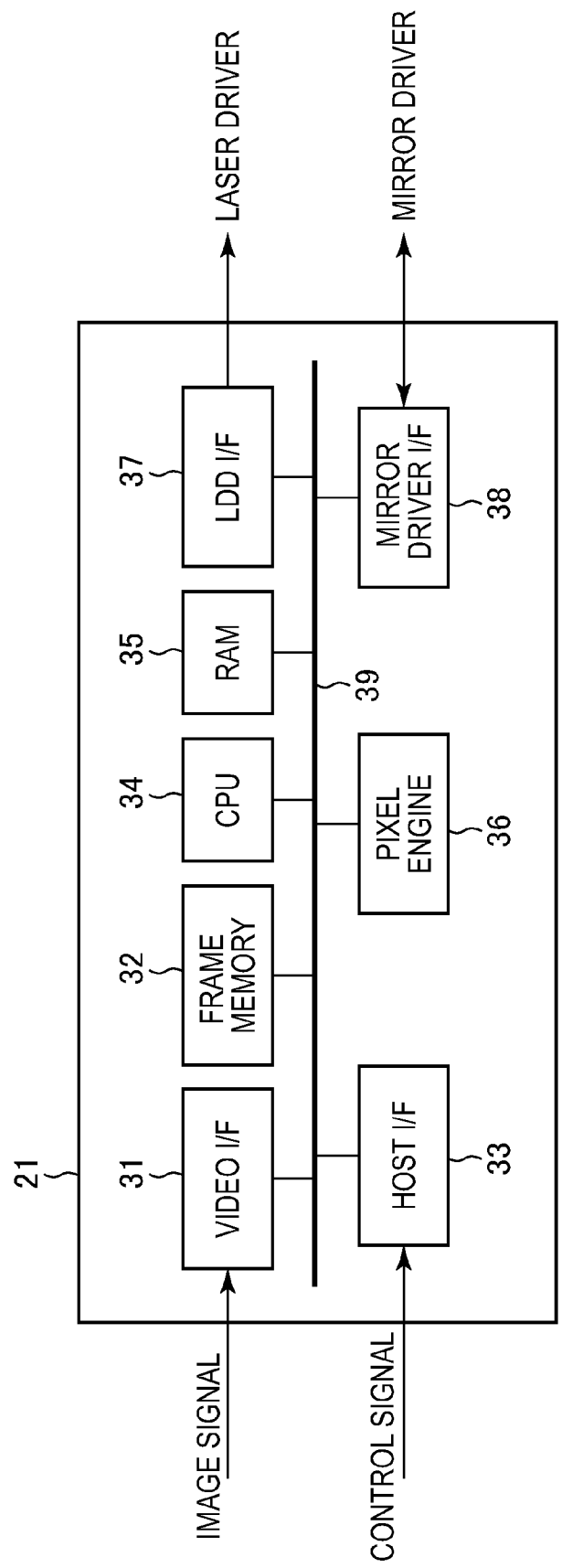
FIG. 4 is a block diagram illustrating an exemplary configuration of a controller.

Next, FIG. 4 is a block diagram illustrating an exemplary configuration of the controller 21.

As illustrated in FIG. 4, the controller 21 includes a video interface (I/F) 31, a frame memory 32, a host I/F 33, a central processing unit (CPU) 34, a random access memory (RAM) 35, a pixel engine 36, a laser diode driver (LDD) I/F 37, and a mirror driver I/F 38 which are connected to one another via a bus 39.

The video I/F 31 is connected to an image reproducing device (not shown), and receives an image signal of the image 12 reproduced by the image reproducing device and supplies the image signal to the frame memory 32 via the bus 39. The frame memory 32 stores the image signal in units of frames of the image 12. The host I/F 33 is connected to a host controller (not shown), and receives a control signal output from the host controller and supplies the control signal to the CPU 34 via the bus 39.

The CPU 34 executes a program developed in the RAM 35 and performs a process on the image 12 stored in the frame memory 32 according to the control signal supplied from the host I/F 33, various kinds of information stored in the RAM 35, or the like. The RAM 35 stores a program executed by the CPU 34, various kinds of information necessary for the CPU 34 or the pixel engine 36 to execute a process, and the like.

The pixel engine 36 performs a process on an image signal stored in the frame memory 32 according to information stored in the RAM 35. For example, the pixel engine 36 performs a process of generating a pixel value of the scan pixel SP based on the pixel values of the 4 pixels P1 to P4 near the scan pixel SP through the 2D interpolation according to the position of the scan pixel SP as described above with reference to FIG. 3. Further, the pixel engine 36 may set information stored in the RAM 35 to a register of the pixel engine 36 and then perform a process or may store an image signal stored in the frame memory 32 in a buffer of the pixel engine 36 at once and then perform a process.

The LDD I/F 37 is connected to the laser driver 22 illustrated in FIG. 1, and supplies an image signal according to a pixel value generated by the pixel engine 36 to the laser driver 22. The laser driver 22 causes the laser sources 24R, 24G, and 24B to emit light, and so image projection of projecting the image 12 onto the screen 13 is performed.

The mirror driver I/F 38 is connected to the mirror driver 23 illustrated in FIG. 1, and acquires the synchronous signal from the mirror driver 23 or adjusts the synchronous signal according to the detection signal supplied from the mirror driver 23.

The controller 21 having the above-described configuration performs a process in the controller 21 on the image signal of the image 12 input to the controller 21, and outputs the processed image signal to the laser driver 22. For example, the controller 21 performs not only a process of correcting deviation occurring in each pixel described above with reference to FIGS. 3A and 3B but also a process of correcting distortion occurring in the image 12 projected onto the screen 13 since a laser is used as a light source.

Figure 5:
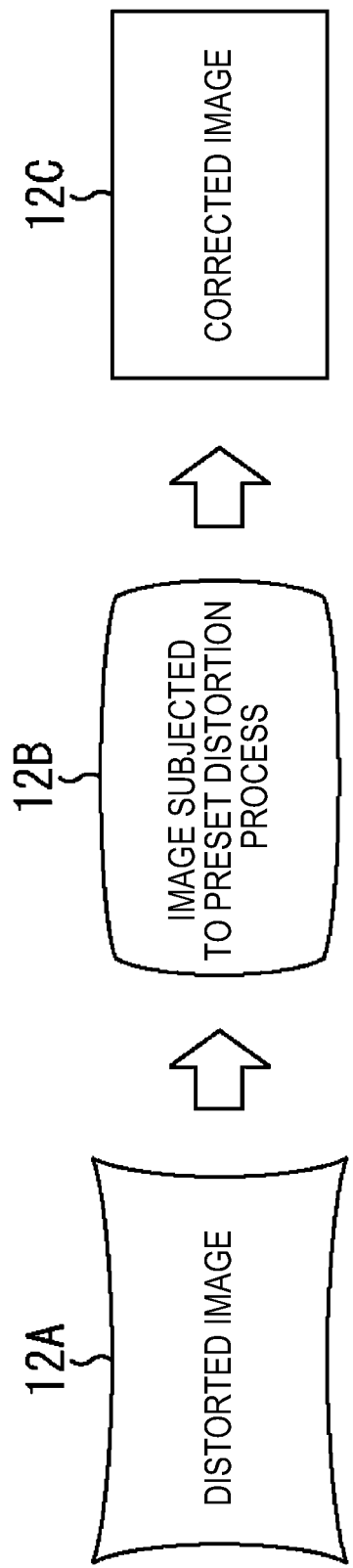
FIG. 5 is a diagram for describing distortion occurring in an image.

Next, distortion occurring in an image projected onto the screen 13 will be described with reference to FIG. 5. Hereinafter, when it is unnecessary to distinguish the laser sources 24R, 24G, and 24B from one another, the laser sources 24R, 24G, and 24B are appropriately referred to simply as a "laser source 24."

In the projection device 11, the micro scanning mirrors 27H and 27V are driven at a high speed to perform scanning with the laser beams emitted from a point light source. At this time, depending on a positional relation between the respective components of the optical path between the laser source 24 and the screen 13 or physical driving operation characteristics of the scanning mirrors 27H and 27V, distortion called pincushion distortion in which four sides curve inward to be concave occurs, and a distorted image 12A is projected.

In the past, in order to prevent the distorted image 12A from being projected, signal processing (a preset distortion process) of distorting four sides to curve outward and have the curvature opposite to the curvature of the pincushion distortion has been performed on the image signal, and then an image 12B which has been subjected to preset distortion correction has been projected. When the image 12B which has been subjected to preset distortion correction is projected onto the screen 13, an image 12C whose four sides are corrected to be straight lines is projected. Here, the image 12 is assumed to be projected in all ranges which the laser beams reach when the laser beams are continuously emitted from the projection device 11.

Meanwhile, since the pincushion distortion is decided depending on a positional relation between the respective components of the optical path between the laser source 24 and the screen 13 or physical driving operation characteristics of the scanning mirrors 27H and 27V as described above, it has been difficult to appropriately correct the distortion. In addition, since the pincushion distortion to be generated dynamically changes in a direction of the screen 13 (a normal direction of the screen 13) viewed from the projection device 11, it is more difficult to perform the correction. Thus, it is very difficult to accurately implement the preset distortion process on the distortion caused by the complex factors through a previously set filter process, and a degree of freedom on the respective components of the optical path is restricted.

In this regard, in the projection device 11, signal processing is performed on the image signal of the image 12 based on the trajectory of the laser beam using the normal information of the screen 13, and thus the image 12 having no distortion can be projected.

A concept of calculating the trajectory of the laser beam in the projection device 11 will be described with reference to FIGS. 6 and 7.

Figure 6:
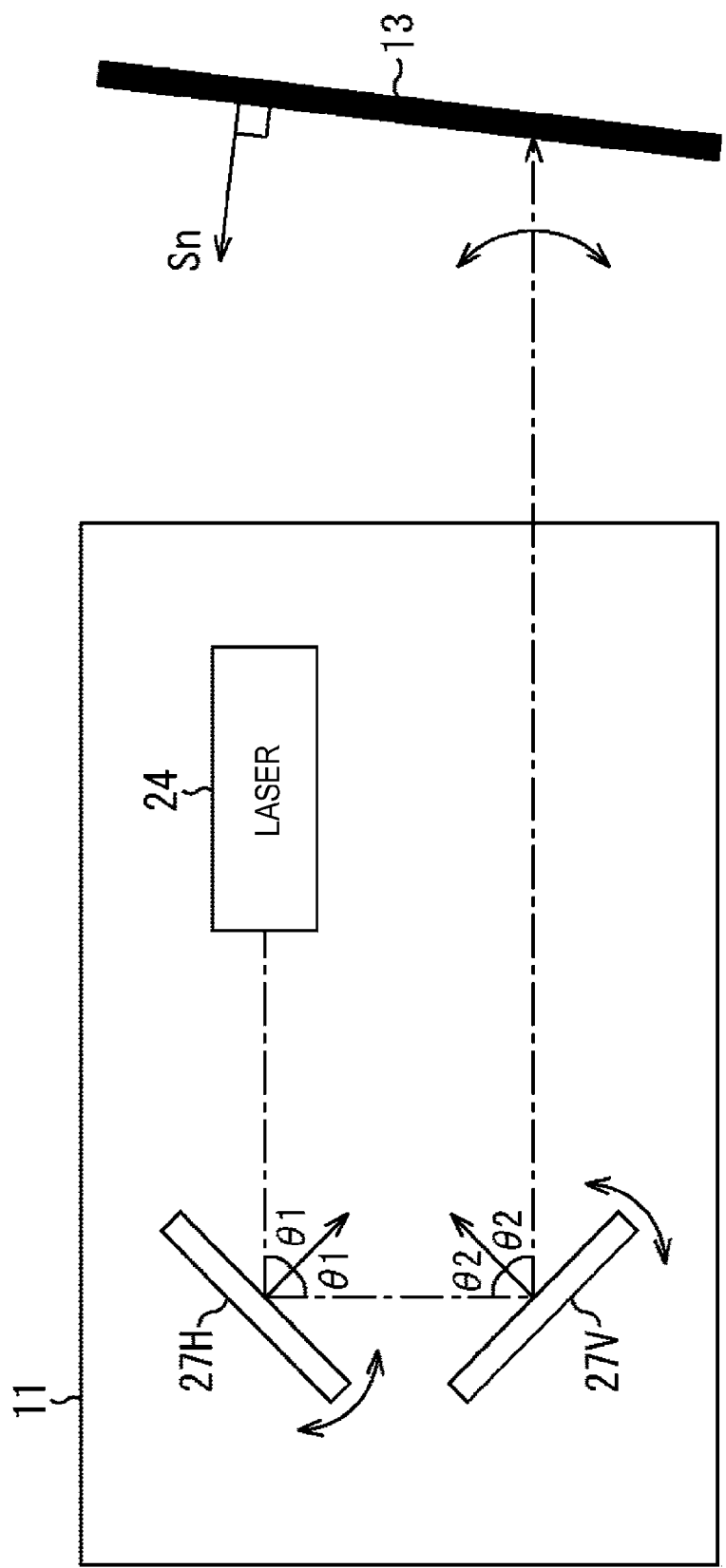
FIG. 6 is a diagram for describing a concept of calculating a trajectory of laser beams.

FIG. 6 illustrates a part of a configuration of the projection device 11 necessary to calculate the trajectory of the laser beams irradiated from the projection device 11 to the screen 13.

A calculation of an optical path through which the laser beams emitted from the laser source 24 is first reflected by the scanning mirror 27H, then reflected by the scanning mirror 27V, and then arrives at the screen 13 as illustrated in FIG. 6 will be described.

Reflection paths of the scanning mirrors 27H and 27V can be obtained based on a positional relation between the laser source 24 and the scanning mirrors 27H and 27V and inclinations when the scanning mirrors 27H and 27V are driven. The laser beams output from the laser source 24 are incident on the scanning mirror 27H at an incident angle $\theta 1$, and the laser beams reflected at a reflection angle $\theta 1$ by the scanning mirror 27H are incident on the scanning mirror 27V at an incident angle $\theta 2$. Thereafter, the laser beams reflected at the reflection angle $\theta 2$ by the scanning mirror 27V arrive at the screen 13 specified by a normal vector Sn.

Then, a projectable region of the screen 13 onto which the laser beams can be projected is specified such that the scanning mirror 27H is rotationally driven in a predetermined range to perform laser beam scanning in the horizontal direction, and the scanning mirror 27V is rotationally driven in a predetermined range to perform laser beam scanning in the horizontal direction. At this time, the pincushion distortion occurs in the projectable region.

Figure 7:
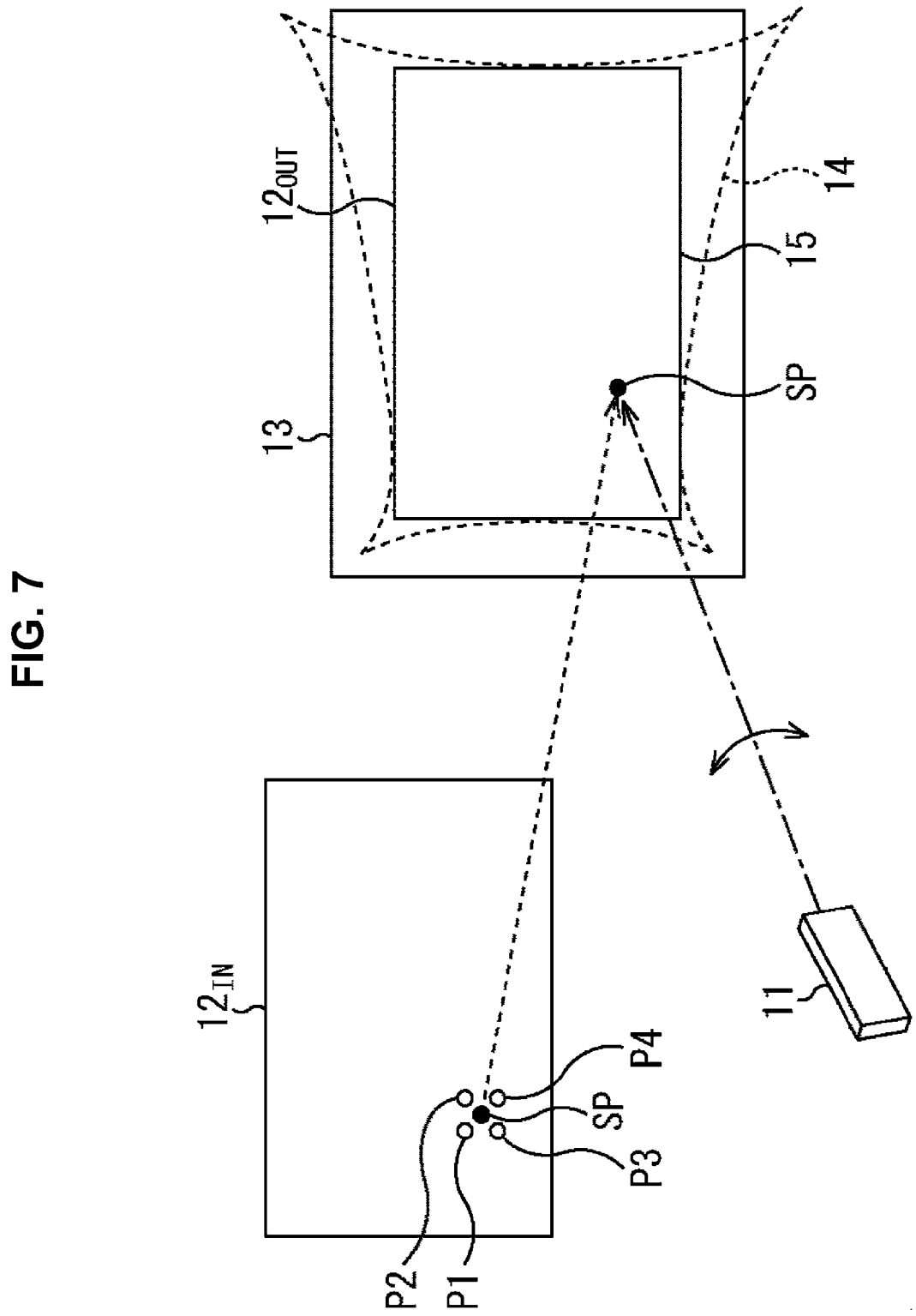
FIG. 7 is a diagram for describing a concept of calculating a trajectory of laser beams.

In other words, as illustrated in FIG. 7, the four sides of the projectable region 14 curve inward and differ from one another in the curvature in the direction of the screen 13. Thus, when the laser source 24 continuously emits the laser beams, an image is projected onto the whole projectable region 14.

In this regard, the projection device 11 sets a region in which the image 12 comes in internal contact with the projectable region 14 as a projection window 15, and emits the lasers only when laser beam scanning is performed on the region inside the projection window 15. In other words, the projection device 11 does not emit the lasers to a portion of the projectable region 14 outside the projection window 15. Through this operation, the projection device 11 can project the image 12 having little distortion inside the projection window 15.

At this time, when the image 12 projected onto the screen 13 is referred to as an output image $12_{OUT}$ and the image input to the controller 21 is referred to as an input image $12_{IN}$, the projection device 1 performs a process of generating the output image $12_{OUT}$ based on the input image $12_{IN}$ so that the output image $12_{OUT}$ fits the projection window 15 on the screen 13. Further, as described above with reference to FIGS. 3A and 3B, the projection device 11 performs a process of generating the pixel value of the scan pixel SP based on the pixel values of the pixels P1 to P4 near the position of the input image $12_{IN}$ at the position corresponding to the scan pixel SP of the output image $12_{OUT}$.

As described above, in order to set the projection window 15 onto which the output image $12_{OUT}$ is projected, the controller 21 of the projection device 11 calculates and acquires the projectable region 14 in which actual distortion is reflected. Further, when the optical lens 28 is arranged on the optical path, based on the trajectory of the laser beams in which a refractive index of the optical lens 28, that is, influence by the optical lens 28, is reflected, an optical path in which a corresponding optical system is considered is calculated.

Figure 8:
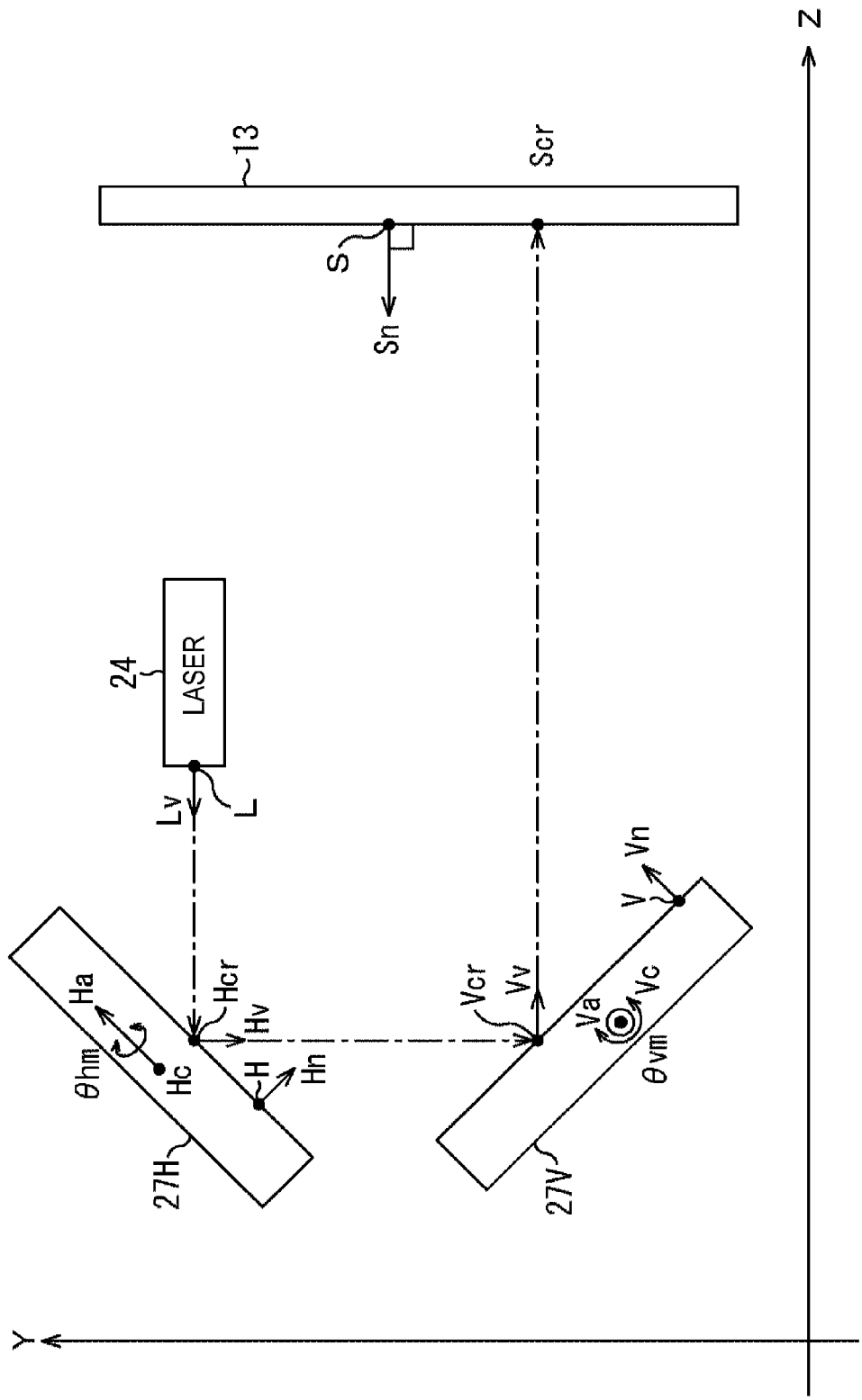
FIG. 8 is a diagram for describing a calculation algorithm for calculating a projectable region in which distortion has occurred.

Next, a calculation algorithm for calculating the projectable region 14 in which distortion has occurred will be described with reference to FIG. 8.

Here, in the following calculation, position coordinates L of a light emitting end of the laser source 24 are represented by L(Lx,Ly,Lz), and a beam vector Lv of the laser beams emitted from the laser source 24 is represented by Lv(Lvx, Lvy,Lvz).

Further, position coordinates H of a certain point on the surface of the scanning mirror 27H are represented by H(Hx, Hy,Hz), and a normal vector Hn of the scanning mirror 27H is represented by Hn(Hnx,Hny,Hnz). Further, position coordinates Hc of a rotational center of the scanning mirror 27H are represented by Hc(Hcx,Hcy,Hcz), and a rotational axis Ha of the scanning mirror 27H is represented by Ha(Hax,Hay,Haz). Further, intersection coordinates Hcr between the scanning mirror 27H and the laser beams are represented by Hcr(Hcrx, Hcry,Hcrz), and a reflection vector Hv in the intersection coordinates Hcr of the scanning mirror 27H is represented by Hv(Hvx,Hvy,Hvz).

Similarly, position coordinates V of a certain point on the surface of the scanning mirror 27V are represented by V(Vx, Vy,Vz), and a normal vector Vn of the scanning mirror 27V is represented by Vn(Vnx,Vny,Vnz). Further, position coordinates Vc of a rotational center of the scanning mirror 27V is represented by Vc(Vcx,Vcy,Vcz), and a rotational axis Va of the scanning mirror 27V is represented by Va(Vax,Vay,Vaz).

Further, the rotational axis Va represents a vector facing the rear of the figure. Further, the intersection coordinates Vcr between the scanning mirror 27V and the laser beams are represented by Vcr(Vcrx,Vcry,Vcrz), and a reflection vector Vv in the intersection coordinates Vcr of the scanning mirror 27V is represented by Vv(Vvx,Vvy,Vvz).

Further, position coordinates S of a certain point on the surface of the screen 13 are represented by S(Sx,Sy,Sz), the normal vector Sn of the screen 13 is represented by Sn(Snx, Sny,Snz), and intersection coordinates Scr between the surface of the screen 13 and the laser beams is represented by Scr(Scrx,Scry,Scrz).

At this time, a normal vector Hn' of the scanning mirror 27V after rotation, a normal vector Hv' of the scanning mirror 27H after rotation, position coordinates H' of a predetermined point on the surface of the scanning mirror 27H after rotation, and position coordinates V' of a predetermined point on the surface of the scanning mirror 27V after rotation are obtained by the following Equations (1) to (4):

$$\text{Quat}(a;Hn')=R(\theta hm,Ha)\cdot\text{Quat}(0;Hn)\cdot Q(\theta hm,Ha) \quad (1)$$

$$\text{Quat}(b;H'-Hc)=R(\theta hm,Ha)\cdot\text{Quat}(0;(H-Hc))\cdot Q(\theta hm,Ha) \quad (2)$$

$$\text{Quat}(c;Vn')=R(\theta vm,Va)\cdot\text{Quat}(0;Vn)\cdot Q(\theta vm,Va) \quad (3)$$

$$\text{Quat}(d;V'-Vc)=R(\theta vm,Va)\cdot\text{Quat}(0;(V-Vc))\cdot Q(\theta vm,Va) \quad (4)$$

In Equations (1) to (4), Quat(r; v) represents a quaternion, r represents a real part (a scalar value), and v represents an imaginary part (a vector value). Further, multiplication of quaternions is defined by the following Equation (5):

$$\text{Quat}(r1;v1)\cdot\text{Quat}(r2;v2)=\text{Quat}(r1*r2-\text{Dot}(v1,v2); r1*v2+r2*v1+\text{Cross}(v1,v2)) \quad (5)$$

In Equation (5), Dot(v1,v2) represents a scalar product of vectors, and Cross(v1,v2) represents a cross product of vectors.

In Equations (1) to (4), $R(\theta,N)$ and $Q(\theta,N)$ are obtained by the following Equations (6) and (7):

$$R(\theta,N)=\text{Quat}(\cos(\theta/2);-N*\sin(\theta/2)) \quad (6)$$

$$Q(\theta,N)=\text{Quat}(\cos(\theta/2);N*\sin(\theta/2)) \quad (7)$$

In Equations (6) and (7), θ represents an angle, and N represents a vector.

Here, in Equations (1) to (4), calculation results of the real parts a, b, c, and d of the quaternions are not used.

Next, the intersection coordinates Hcr between the laser beams from the laser source 24 and the scanning mirror 27H and the reflection vector Hv of the laser beams in the scanning mirror 27H are calculated by the following Equations (8) and (9):

$$Hv=Lv-2*\text{Dot}(Lv,Hn')*Hn' \quad (8)$$

$$Hcr=th*Lv+L \quad (9)$$

Dot(Lv,Hn') in Equation (8) represents a scalar product of vectors, and th=Dot((H'−L),Hn')/Dot(Lv,Hn')) in Equation (9). Further, based on Equations (8) and (9), the intersection coordinates Vcr between the laser beams and the scanning mirror 27V and the reflection vector Vv of the laser beams in the scanning mirror 27V are calculated by the following Equations (10) and (11):

$$Vv=Hv-2*\text{Dot}(Hv,Vn')*Vn' \quad (10)$$

$$Vcr=tv*Hv+Hcr \quad (11)$$

In Equation (11), tv=Dot((V'−Hcr),Vn')/Dot(Hv,Vn')).

Further, the intersection coordinates Scr between the laser beams and the screen 13 calculated by Equation (10) and Equation (11) are calculated by the following Equation (12).

$$Scr=ts*Vv+Vcr \quad (12)$$

In Equation (12), ts=Dot((S−Vcr),Sn)/Dot(Vv,Sn).

Then, coordinates (X,Y) on the input image can be calculated by performing projective transformation on the intersection coordinates Scr as expressed in the following Equations (13) and (14).

$$X=Scrx*\text{scale\_}x+\text{offset\_}x \quad (13)$$

$$Y=Scry*\text{scale\_}y+\text{offset\_}y \quad (14)$$

Here, Equation (13) and Equation (14) illustrate examples of parallel projection under the assumption that a point of view is at coordinates (0,0,0), and the screen 13 is positioned in a direction from the point of view to (0,0,1), and offset_x, offset_y, scale_x and scale_y are parallel transformation parameters. The above calculation is an example, and a calculation may be performed based on any other algorithm.

As described above, the projectable region 14 can be calculated based on the trajectory in which scanning with the laser beams is performed on the screen 13 using the normal vector Sn of the screen 13. Then, the projection window 15 serving as a range in which the image 12 is actually projected is set such that the laser source 24 is turned on to emit the laser beams within the projectable region 14.

Further, the process of calculating the projectable region 14 and the process of setting the projection window are performed by an information processing unit which is implemented such that the CPU 24 executes a program in the controller 21.

Figure 9:
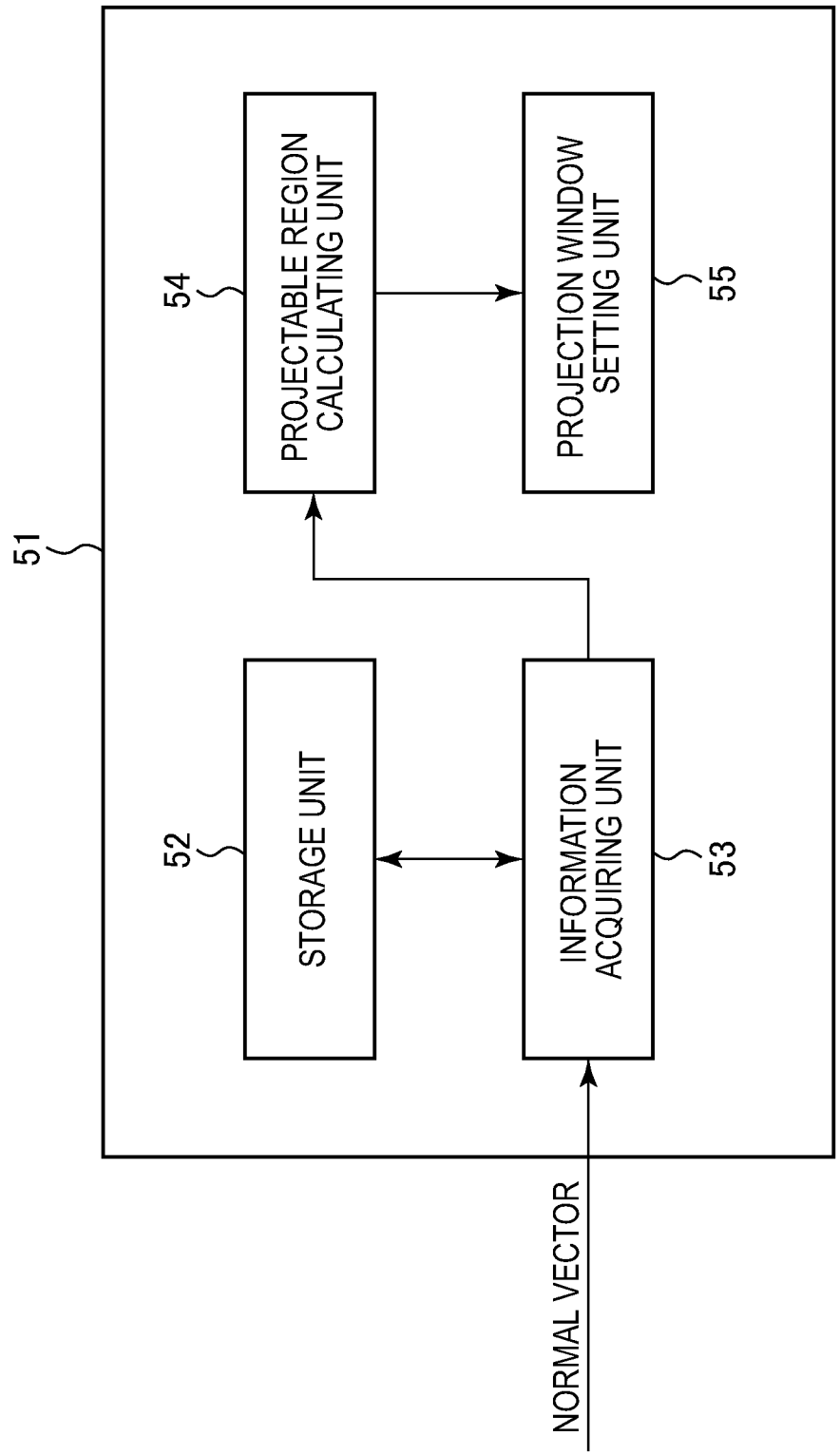
FIG. 9 is a functional block diagram illustrating a function implemented by executing a program through a CPU.

Next, FIG. 9 is a functional block diagram illustrating an information processing unit which is implemented such that the CPU 34 illustrated in FIG. 4 executes a program.

As illustrated in FIG. 9, an information processing unit 51 includes a storage unit 52, an information acquiring unit 53, a projectable region calculating unit 54, and a projection window setting unit 55.

The storage unit 52 stores information such as vector information and position information which are necessary to calculate the projectable region 14. For example, the storage unit 52 stores the normal vector Sn of the screen 13, the position coordinates L of the light emitting end of the laser source 24, the beam vector Lv of the laser beams emitted from the laser source 24, the normal vector Hn of the scanning mirror 27H, the position coordinates Hc of the rotational center of the scanning mirror 27H, the rotational axis Ha of the scanning mirror 27H, the normal vector Vn of the scanning mirror 27V, the position coordinates Vc of the rotational center of the scanning mirror 27V, and the rotational axis Va of the scanning mirror 27V, which are described above with reference to FIGS. 6 to 8.

The information acquiring unit 53 acquires necessary information from the storage unit 52 according to an arithmetic operation performed by the projectable region calculating unit 54, and supplies the acquired information to the projectable region calculating unit 54. Further, the information acquiring unit 53 may acquire, for example, information representing the normal vector Sn of the screen 13 supplied from the outside through the host I/F 33 illustrated in FIG. 4, and store the acquired information in the storage unit 52. For example, the information acquiring unit 53 acquires information representing the normal vector Sn supplied from a host controller 71 as will be described later with reference to FIG. 14.

The projectable region calculating unit 54 performs the arithmetic operation using the information supplied from the information acquiring unit 53, and calculates the projectable region 14 of the screen 13 onto which the laser beams can be projected. In other words, the projectable region calculating unit 54 calculates the projectable region 14 based on the trajectory on the screen 13 in which scanning with the laser beams is performed using the normal vector Sn of the screen 13.

The projection window setting unit 55 causes the laser beams to be emitted to the inside of the projectable region 14 calculated by the projectable region calculating unit 54 and sets the projection window 15 serving as a region onto which the output image $12_{OUT}$ is projected. Then, the projection window setting unit 55 supplies information representing the set projection window 15 to be stored in the RAM 35 illustrated in FIG. 4.

As described above, the information processing unit 51 calculates the projectable region 14 through the projectable region calculating unit 54, sets the projection window 15 through the projection window setting unit 55, and causes the projection window 15 to be stored in the RAM 35. Then, a process of generating the output image $12_{OUT}$ based on the input image $12_{IN}$ is performed so that the output image $12_{OUT}$ appropriate to the projection window 15 stored in the RAM 35 is projected.

Then, in the projection device 11, when scanning of the laser beams to be projected onto the screen 13 is performed within the projectable region 14, a pixel signal representing the pixel value of the scan pixel SP according to the trajectory of the laser beam in the set projection window 15 is supplied to the laser driver 22 at a desired timing. As a result, the laser sources 24R, 24G, and 24B emit light, and thus the scan pixel SP is projected. This operation is repeatedly performed according to scanning in which the trajectory of the laser beam is within the projection window 15, so that the 2D image 12 is projected.

Figure 10:
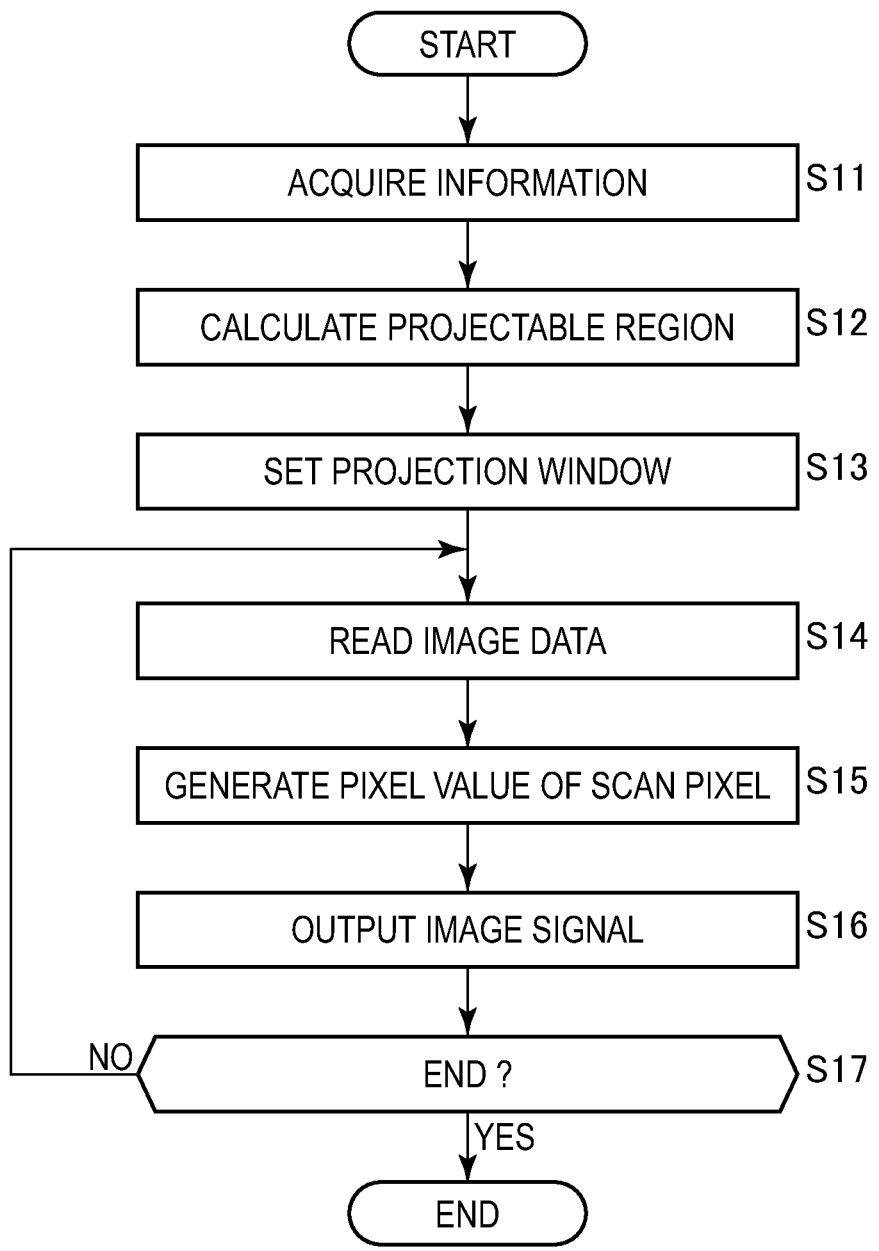
FIG. 10 is a flowchart for describing a process of projecting an image.

Next, a process in which the controller 21 projects the image 12 onto the screen 13 will be described with reference to a flowchart of FIG. 10.

For example, the process starts when the image signal of the input image $12_{IN}$ starts to be supplied to the video I/F 31. In step S11, the information acquiring unit 53 acquires information stored in the storage unit 52, and supplies the acquired information to the projectable region calculating unit 54.

In step S12, the projectable region calculating unit 54 calculates the projectable region 14 by performing the above-described arithmetic operation using the information supplied from the information acquiring unit 53.

In step S13, the projection window setting unit 55 sets the projection window 15 to the inside of the projectable region 14 calculated by the projectable region calculating unit 54.

In step S14, the pixel engine 36 reads the image signal of the input image $12_{IN}$ stored in the frame memory 32 through the video I/F 31.

In step S15, the pixel engine 36 generates the output image $12_{OUT}$ by generating the pixel value of the scan pixel SP in the projection window 15 through the 2D interpolation according to the position of the scan pixel SP of the output image $12_{OUT}$ based on the image signal of the input image $12_{IN}$ read in step S14 according to the information stored in the RAM 35.

In step S16, the pixel engine 36 outputs the image signal of the output image $12_{OUT}$ generated in step S15 to the laser driver 22 through the LDD I/F 37. As a result, the laser driver 22 causes the laser sources 24R, 24G, and 24B to emit light, so that the image 12 is projected.

In step S17, the CPU 34 determines whether or not the process ends, and for example, when an operation of ending the image projection is performed or when the supply of the image signal of the input image $12_{IN}$ stops, it is determined that the process ends. However, when the CPU 34 determines that the process does not end in step S17, the process returns to step S14, and the same process is repeated.

As described above, the projection device 11 calculates the projectable region 14 according to an arrangement and a condition of an optical path, and causes the laser beams to be actually emitted to the inside of the projectable region 14 to the projection window 15 in which the image 12 is projected. As a result, the image 12 in which distortion has been easily corrected with a high degree of accuracy can be dynamically projected through the normal vector Sn of the screen 13. Further, it is possible to easily cope with a variation or a change in the components of the optical path and increase a degree of freedom thereof.

Further, for example, when the projectable region 14 is calculated, the projectable region calculating unit 54 may discretely calculate the trajectory of the laser beam to be projected onto the screen 13 and discretely obtains a position (hereinafter referred to as a "rendering pixel position") of a pixel to be rendered on the screen 13. In this case, when the pixel engine 36 renders the output image $12_{OUT}$, it is possible to interpolate the discretely calculated rendering pixel position and obtain the pixel value of the scan pixel SP corresponding to the rendering pixel position therebetween.

A method of discretely calculating the rendering pixel position will be described with reference to FIGS. 11A and 11B.

In FIG. 11A, the rendering pixel positions based on the trajectory of spots of the laser beams projected onto the screen 13 which is calculated by the projectable region calculating unit 54 are represented by black circles. As illustrated in FIG. 11A, the rendering pixel positions are discretely calculated according to the trajectory of spots of the laser beams, and the projectable region 14 is obtained based on the rendering pixel positions. Further, a desired rendering pixel position can be calculated such that the pixel engine 36 performs interpolation between two adjacent rendering pixel positions which are discretely calculated through the filtering process at the time of rendering.

In other words, it is possible to calculate pixel values of rendering pixel positions 63 to 68 interpolated between rendering pixel positions 61 and 62 as illustrated in FIG. 11B such that the pixel engine 36 performs interpolation between two positions of the rendering pixel position 61 and 62 illustrated in FIG. 11A through the filter process.

As a result, compared to when all rendering pixel positions rendered on the screen 13 are calculated based on the trajectory of spots of the laser beams, the computational cost can be reduced, and a memory amount for storing the projectable region 14 can be reduced.

The projection device 11 uses the two scanning mirrors 27H and 27V to perform two-dimensional scanning with the laser beams as described above with reference to FIG. 1, but for example, a single scanning mirror may be used to perform two-dimensional scanning with the laser beams.

Figure 12:
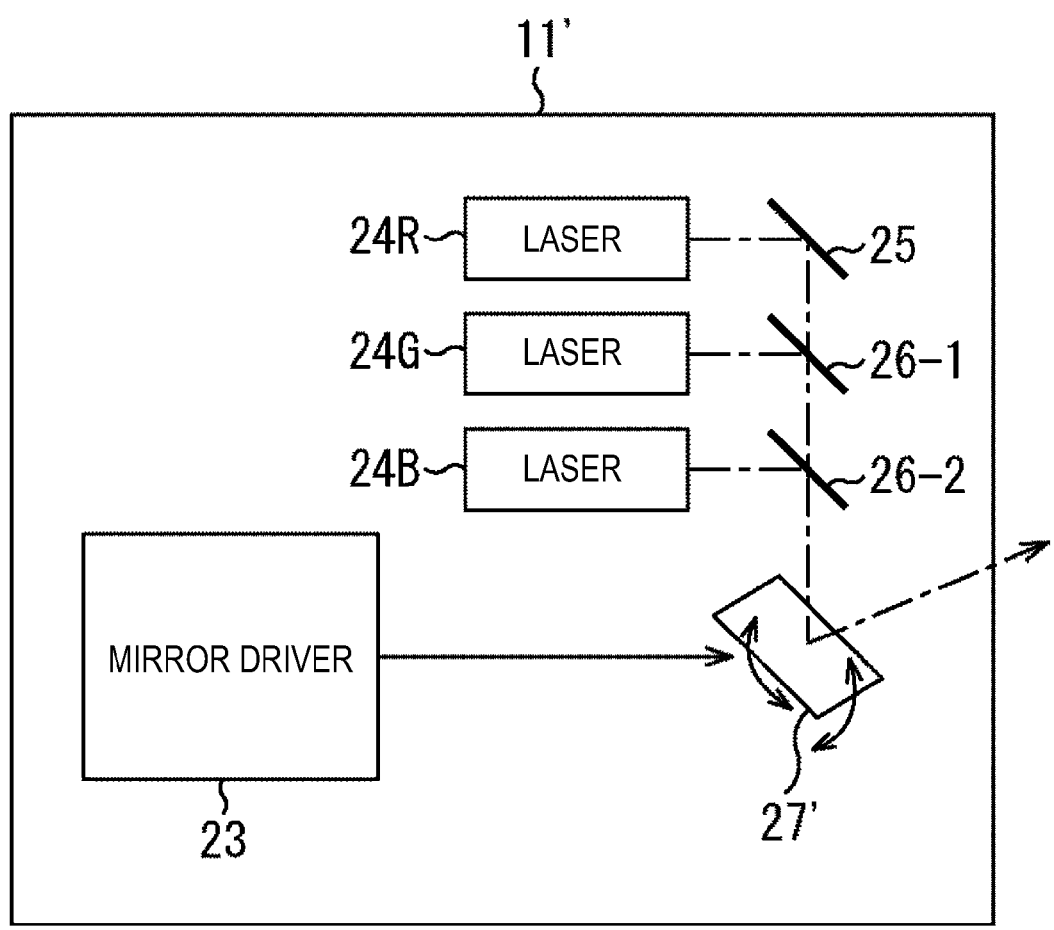
FIG. 12 is a diagram illustrating a modification of a projection device.

FIG. 12 illustrates a modification of the projection device 11.

A projection device 11' includes a controller 21, a laser driver 22, a mirror driver 23, laser sources 24R, 24G, and 24B, a mirror 25, dichroic mirrors 26-1 and 26-2, and an optical lens 28, similarly to the projection device 11 of FIG. 1, but the controller 21, the laser driver 22, and the optical lens 28 are not illustrated in FIG. 12.

Further, the projection device 11' includes a scanning mirror 27' instead of the scanning mirrors 27H and 27V.

The scanning mirror 27' is rotationally driven in two axial directions according to a scan signal supplied from the mirror driver 23 so that scanning with the laser beam is performed in the horizontal direction and the vertical direction of the image 12. As described above, in the projection device 11', the image 12 can be projected such that the single scanning mirror 27' is driven in directions orthogonal to each other, and at this time, the projectable region 14 can be also obtained in the same manner as described above.

In addition, the projection device 11 can project the image 12 onto a screen 13 having a single plane so that distortion does not occur, and can also project the image 12 onto a screen 13 having a plurality of planes so that distortion does not occur on either of the planes.

An example of projecting the image 12 onto a screen 13' having two planes will be described with reference to FIGS. 13A and 13B.

Figure 13:
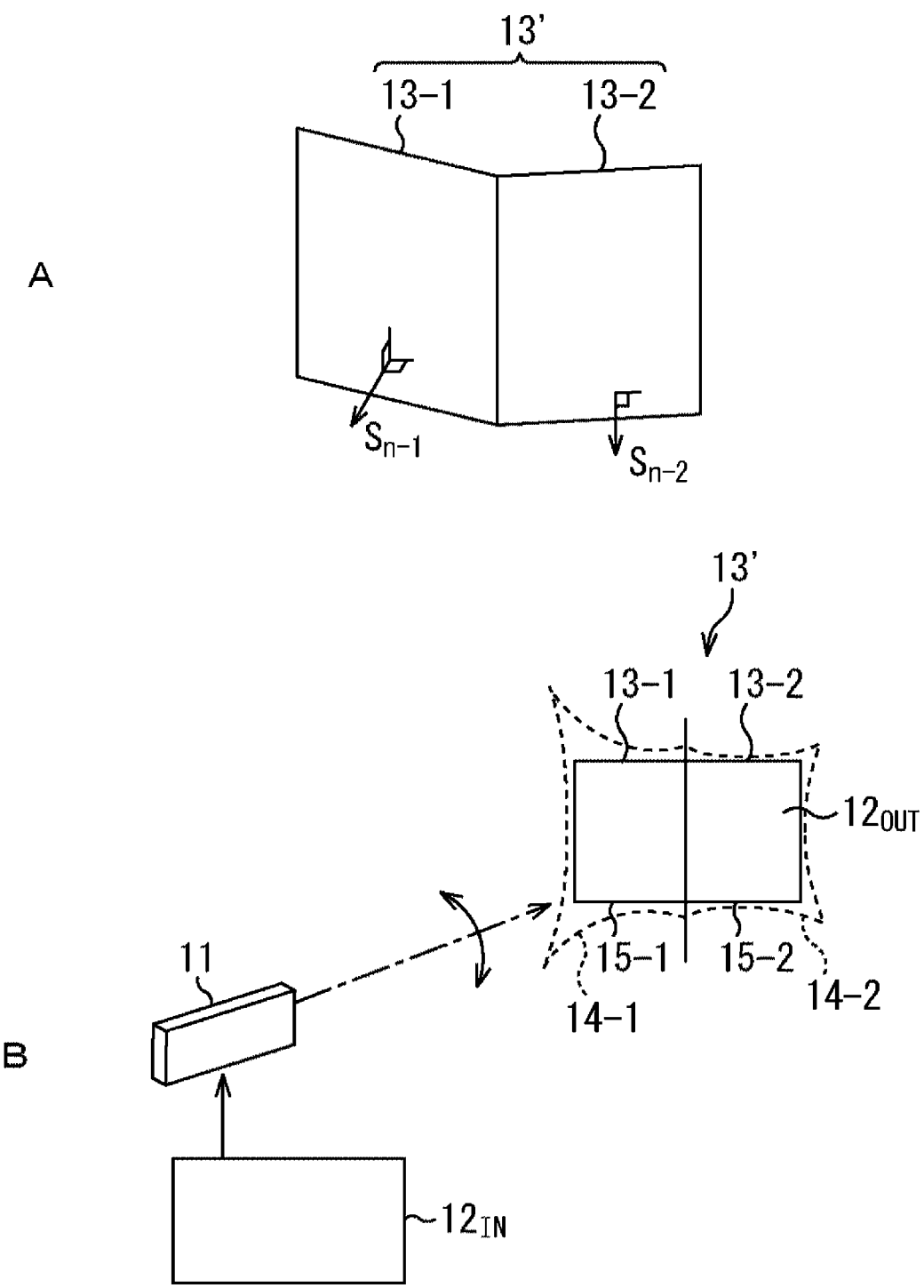
FIGS. 13A and 13B are diagrams for describing an example in which an image is projected onto a screen having two planes.

As illustrated in FIG. 13A, the screen 13' includes a screen 13-1 having a plane specified by a normal vector Sn-1 and a screen 13-2 having a plane specified by a normal vector Sn-2. At this time, the normal vectors Sn-1 and Sn-2 represent different directions.

At this time, the projectable region calculating unit 54 divides the screen 13' into the screen 13-1 and 13-2 using the normal vector Sn-1 and Sn-2 and calculates projectable regions 14-1 and 14-2. Then, the projection window setting unit 55 sets projection windows 15-1 and 15-2 to the projectable regions 14-1 and 14-2, respectively, and the output image 12$_{OUT}$ is generated based on the input image 12$_{IN}$.

Thus, the projection device 11 can easily project the image 12 having little distortion onto each of the two planes of the screen 13'. Similarly, the projection device 11 can also project the image 12 having little distortion onto each plane of a screen having two or more planes as well as the screen 13 having a single plane.

Figure 14:
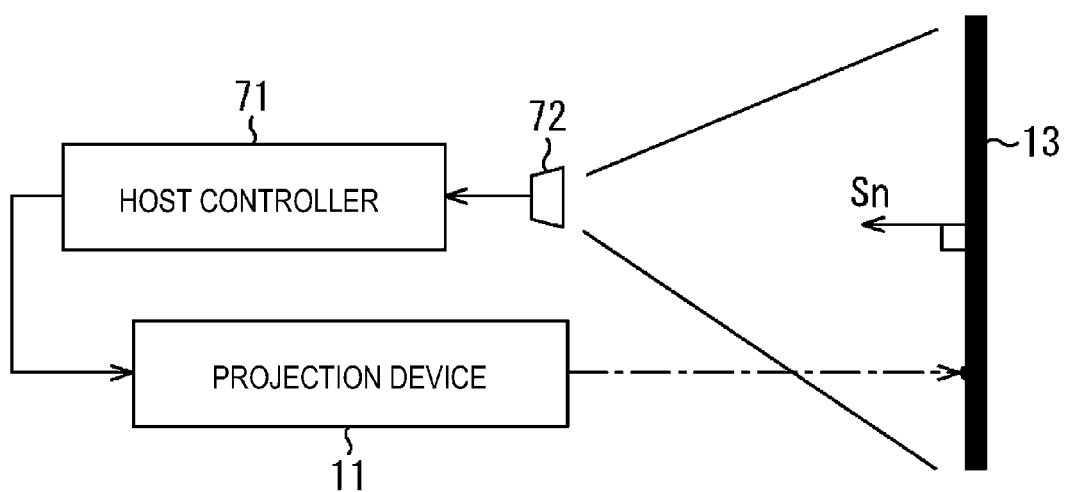
FIG. 14 is a diagram illustrating an exemplary configuration of a projection system.

FIG. 14 illustrates an exemplary configuration of a projection system capable of acquiring the normal vector Sn of the screen 13.

As illustrated in FIG. 14, a projection system includes a projection device 11, a host controller 71, and an imaging device 72.

In this projection system, the imaging device 72 acquires information projected onto the screen 13 and supplies the acquired information to the host controller 71, and the host controller 71 calculates the normal vector Sn of the screen 13 based on the supplied information, and transfers the normal vector Sn to the projection device 11. The information representing the normal vector Sn is acquired by the information acquiring unit 53 illustrated in FIG. 9.

For example, the projection device 11 assigns information (for example, a mark) recognizable by the imaging device 72 to the outside (frame) of the output image 12$_{OUT}$ or a predetermined position, and outputs the resultant data. The imaging device 72 outputs an imaged image obtained by imaging the output image 12$_{OUT}$ projected onto the screen 13, and the host controller 71 recognizes the mark of the output image 12$_{OUT}$ projected onto the screen 13 based on the imaged image.

Then, the host controller 71 can calculate the normal vector Sn of the screen 13 by calculating a distance from the projection device 11 to a projection plane based on the recognized mark and the size of the output image 12$_{OUT}$ and performing a trigonometric operation based on a position at which the mark is viewed from the imaging device 72. Further, a projection angle of the projection device 11 and a distance between the projection device 11 and the imaging device 72 are assumed to be known in advance and set to the host controller 71. As described above, the projectable region calculating unit 54 calculates the projectable region 14 based on the normal vector Sn of the screen 13 calculated by the host controller 71.

Further, for example, the projection device 11 may not only acquire the normal vector Sn of the information acquiring unit 53 from the image imaged by the imaging device 72 but may also acquire information representing the normal vector Sn of the screen 13 according to information input to an input device (not shown) by the user. For example, the user can input information specifying the screen 13 so that distortion of the image 12 is corrected while viewing the image 12 projected onto the screen 13, and the projection device 11 can deal with the input information as the normal vector Sn. In other words, information used for a calculation of the projectable region 14 is not limited to the information representing the normal vector Sn.

In addition, the function of the host controller 71 may be integrated into the controller 21 of the projection device 11.

The above description has been made in connection with the example in which the projection window 15 is set to come in internal contact with the projectable region 14, that is, in which the projection window 15 is set to be maximum inside the projectable region 14, but the projection window 15 may be set in various manners as long as it is a region inside the projectable region 14. Here, the example in which the projection window 15 is set to come in internal contact with the projectable region 14 is referred to as a first setting example.

Next, a second setting example of a projection window will be described with reference to FIG. 15.

Figure 15:
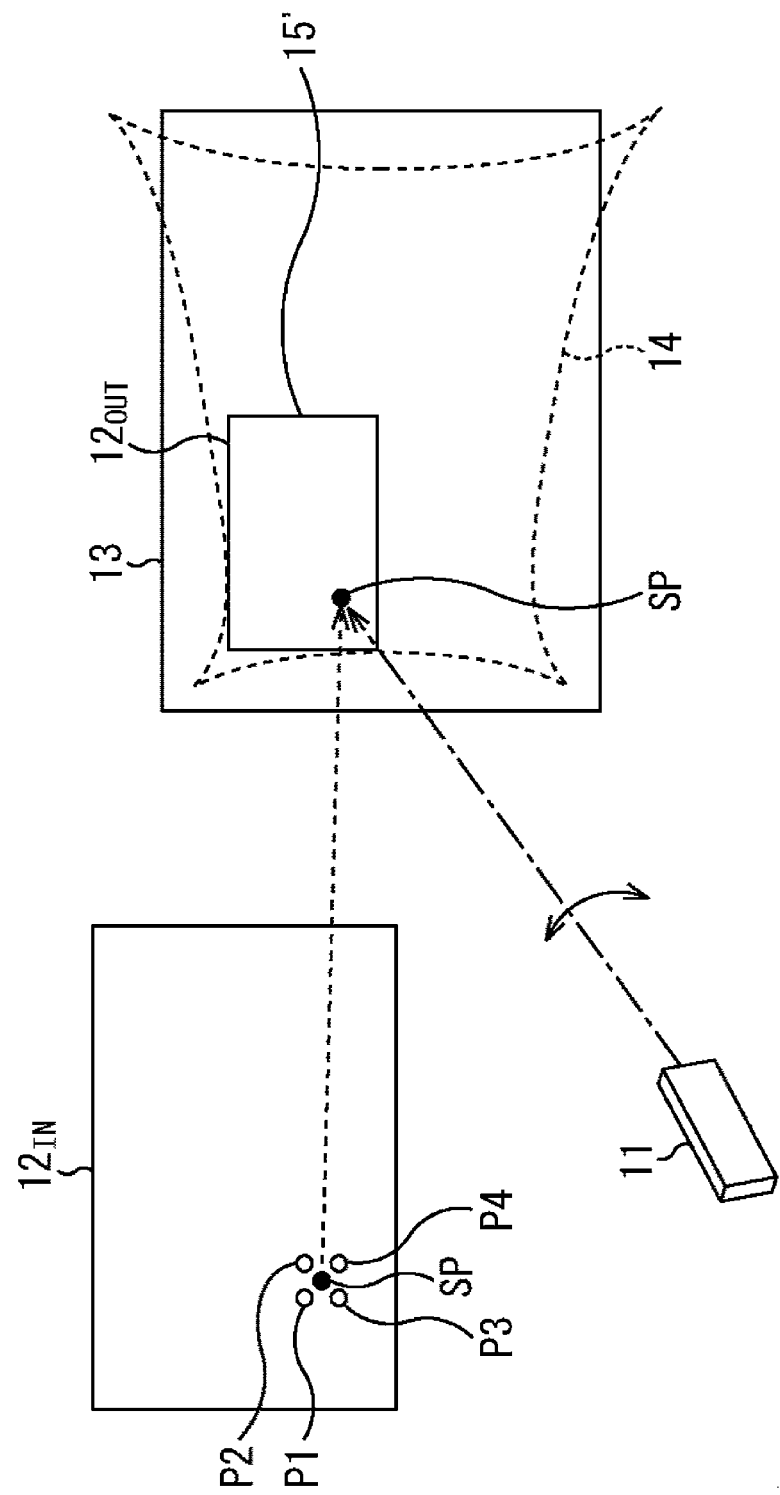
FIG. 15 is a diagram illustrating a second setting example of a projection window.

FIG. 15 illustrates an example in which a projection window 15' is set at an upper left side of the projectable region 14. Further, the projection window 15' is assumed to have the same aspect ratio as the image 12, and a pixel value of a scan pixel SP is calculated based on pixel values of pixels P1 to P4 of an input image 12$_{IN}$ which are present around a position corresponding to the scan pixel SP of an output image 12$_{OUT}$.

Next, a third setting example of a projection window will be described with reference to FIG. 16.

Figure 16:
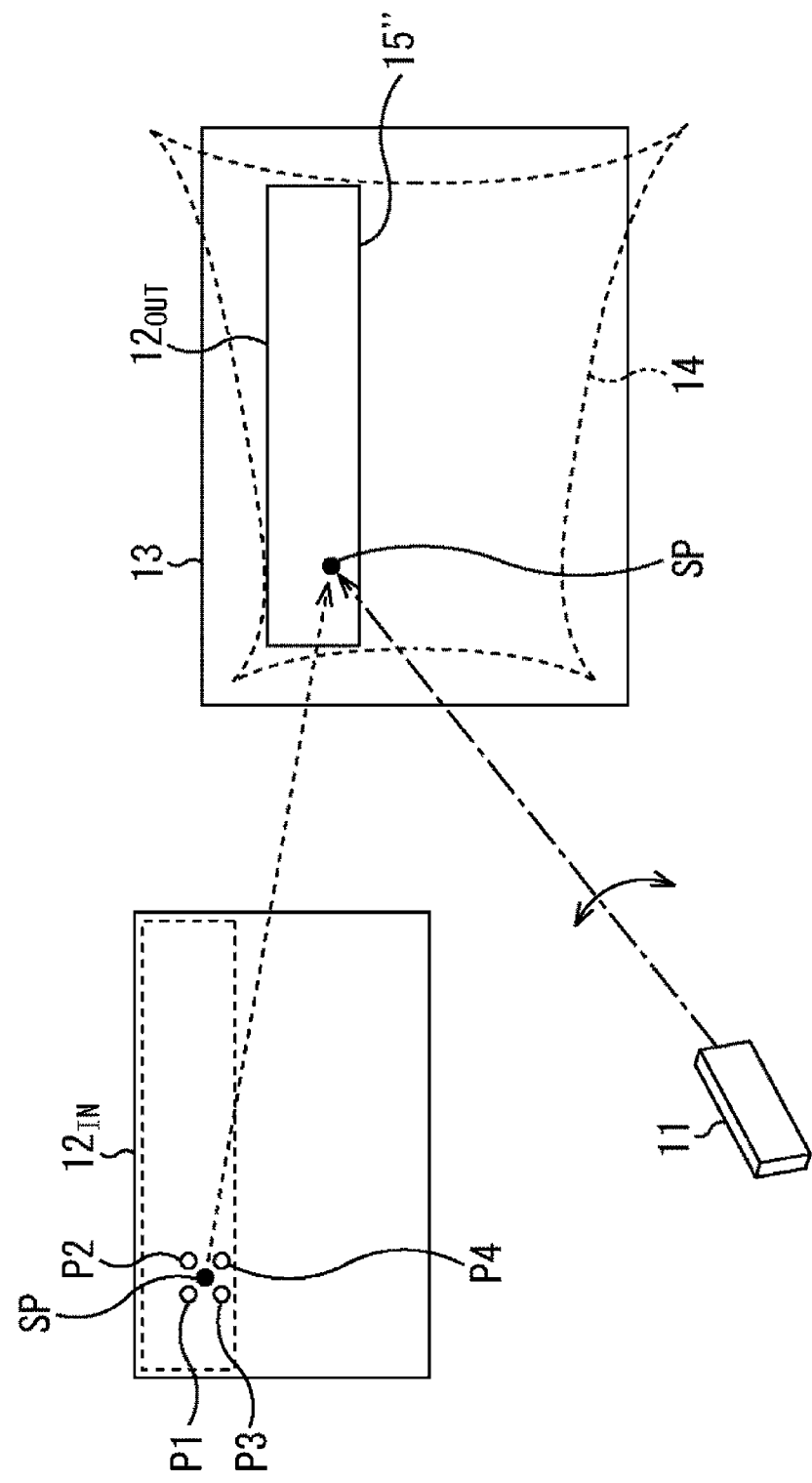
FIG. 16 is a diagram illustrating a third setting example of a projection window.

FIG. 16 illustrates an example in which a horizontally long projection window 15" is set at an upper side of the projectable region 14. The projection window 15" is assumed to have a different aspect ratio from the image 12, and a pixel value of a scan pixel SP is calculated based on pixel values of pixels P1 to P4 of the input image 12$_{IN}$ present in a region corresponding to a horizontally long image 12$_{OUT}$.

As described above, in the projection device 11, the projection window setting unit 55 can set the projection window 15 in a desired region inside the projectable region 14, and information representing the set projection window 15 is stored in the RAM 35. Thus, the output image 12$_{OUT}$ can be projected onto the screen 13 such that matching between the input image 12$_{IN}$ and the projection window 15 is performed by performing the above-described process based on the information representing the projection window 15 stored in the RAM 35. Thus, the projection device 11 can flexibly set the projection window 15 to the projectable region 14 and thus project the image 12 with a high degree of freedom.

Then, by inserting the removable medium 111 into the drive 110, the program can be installed in the storage unit 908 via the input/output interface 105. Further, the program can be received by the communication unit 109 via a wired or wireless transmission medium and installed in the storage unit 908. Moreover, the program can be installed in advance in the ROM 102 or the storage unit 908.

The above-described series of processing (an information processing method) may be performed by hardware or may be performed by software. When the series of processing is performed by software, a program forming the software is installed into a computer that is incorporated in a dedicated hardware, or installed from a program storage medium having a program recorded thereon into a general-purpose personal computer, for example, that can perform various types of functions by installing various types of programs.

Figure 17:
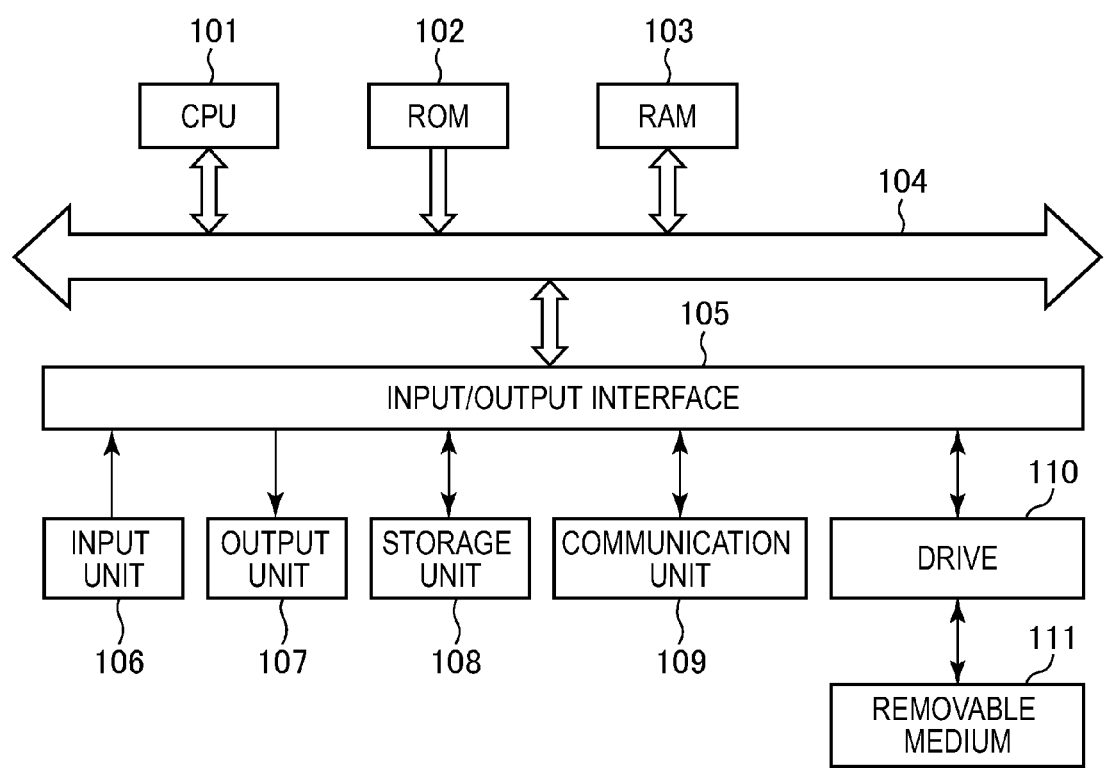
FIG. 17 is a block diagram illustrating an exemplary configuration of a computer according to an embodiment of the present technology.

FIG. 17 is a block diagram showing an example configuration of the hardware of a computer that executes the series of processes described earlier according to a program.

In the computer, a central processing unit (CPU) 101, a read only memory (ROM) 102 and a random access memory (RAM) 103 are mutually connected by a bus 104.

Further, an input/output interface 105 is connected to the bus 104. Connected to the input/output interface 105 are an input unit 106 formed by a keyboard, a mouse, a microphone and the like, an output unit 107 formed by a display, a speaker and the like, a storage unit 108 formed by a hard disk, a nonvolatile memory and the like, a communication unit 109 formed by a network interface and the like, and a drive 110 that drives a removable medium 111 that is a magnetic disk, an optical disk, a magneto-optical disk, or a semiconductor memory etc.

In the computer configured as described above, the CPU 101 loads a program that is stored, for example, in the storage unit 108 onto the RAM 103 via the input/output interface 105 and the bus 104, and executes the program. Thus, the above-described series of processing is performed.

The program executed by the computer (the CPU 101) is recorded in the removable medium 111, which is a package medium formed by, for example, a magnetic disc (including a flexible disk), an optical disk (a compact disc read only memory (CD-ROM), a digital versatile disc (DVD) or the like), a magneto optical disk, or a semiconductor memory etc. Alternatively, the program is provided via a wired or wireless transmission medium, such as a local area network, the Internet and a digital satellite broadcast.

Then, by inserting the removable medium 111 into the drive 110, the program can be installed in the storage unit 908 via the input/output interface 105. Further, the program can be received by the communication unit 109 via a wired or wireless transmission medium and installed in the storage unit 108. Moreover, the program can be installed in advance in the ROM 102 or the storage unit 108.

Additionally, the present technology may also be configured as below.

(1) An image output device including:
  a projectable region calculating unit that calculates a projectable region which is a region on a screen in which laser beam is projectable based on a trajectory in which scanning with the laser beam is performed using information specifying the screen onto which an image is projected by two-dimensional scanning with the laser beam;
  a projection window setting unit that causes the laser beam to be emitted and sets a projection window serving as a range in which the image is projected in the projectable region; and
  a generating unit that generates a pixel value of each of positions corresponding to pixels included in the image within the projection window on the screen for each pixel in a manner that the image is projected in the range set by the projection window.

(2) The image output device according to (1),
  wherein the projectable region calculating unit calculates the projectable region using normal information representing a direction of a normal line orthogonal to a plane of the screen as the information specifying the screen.

(3) The image output device according to (1) or (2),
  wherein the generating unit defines a predetermined position at which the laser beam is radiated within the projection window on the screen as a projection pixel, and generates a pixel value of the projection pixel based on pixel values of a plurality of pixels of the image around a position corresponding to the projection pixel.

(4) The image output device according to any one of (1) to (3), further including:
  a laser source that generates the laser beam; and
  a scanning mirror that reflects the laser beam output from the laser source and performs two-dimensional scanning with the laser beam.

(5) The image output device according to any one of (1) to (4), further including:
  an optical lens that is arranged on an optical path from the scanning mirror to the screen and corrects the optical path of the laser beam,
  wherein the projectable region calculating unit calculates the projectable region based on a trajectory of the laser beam in which influence by the optical lens is reflected.

(6) The image output device according to any one of (2) to (5),
  wherein, when the screen has a plurality of planes, the projectable region calculating unit calculates the projectable region using normal information of each of the plurality of planes of the screen.

(7) The image output device according to any one of (1) to (6),
  wherein the projectable region calculating unit discretely calculates the trajectory of the laser beam projected onto the screen, and
  the generating unit generates a pixel value at a position at which the trajectory of the laser beam discretely calculated by the projectable region calculating unit is interpolated.

(8) The image output device according to any one of (2) to (7), further including:
  an information acquiring unit that acquires normal information of the screen.

(9) The image output device according to any one of (2) to (8), further including:
  an imaging unit that images an image projected onto the screen and outputs an imaged image; and
  a calculating unit that calculates normal information of the screen based on information which is included in the image and recognized from the imaged image output from the imaging unit.

(10) The image output device according to any one of (1) to (9), further including:
  a storage unit that stores the projection window set by the projection window setting unit,
  wherein the generating unit generates an image to be output to be projected onto the screen based on an image input to be projected onto the screen based on the projection window stored in the storage unit.

The present embodiment is not limited to the above-described embodiment, and various changes can be made within the scope not departing from the gist of the present disclosure.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-216649 filed in the Japan Patent Office on Sep. 28, 2012, the entire content of which is hereby incorporated by reference.

What is claimed is:

1. An image output device comprising:
 a projectable region calculating unit configured to calculate a projectable region using information specifying a screen onto which an image is projected by scanning with laser beam;
 a projection window setting unit configured to set a projection window serving as a range in which the image is projected in the projectable region; and
 a generating unit configured to generate a pixel value of each of positions corresponding to pixels in a manner that the image is projected in the range set by the projection window.

2. The image output device according to claim 1, wherein the projectable region calculating unit calculates the projectable region using normal information representing a direction of a normal line orthogonal to a plane of the screen as the information specifying the screen.

3. The image output device according to claim 1, wherein the generating unit defines a predetermined position at which the laser beam is radiated within the projection window on the screen as a projection pixel, and generates a pixel value of the projection pixel based on pixel values of a plurality of pixels of the image around a position corresponding to the projection pixel.

4. The image output device according to claim 1, further comprising:
 a laser source that generates the laser beam; and
 a scanning mirror that reflects the laser beam output from the laser source and performs two-dimensional scanning with the laser beam.

5. The image output device according to claim 1, further comprising:
 an optical lens that is arranged on an optical path from the scanning mirror to the screen and corrects the optical path of the laser beam,
 wherein the projectable region calculating unit calculates the projectable region based on a trajectory of the laser beam in which influence by the optical lens is reflected.

6. The image output device according to claim 2, wherein, when the screen has a plurality of planes, the projectable region calculating unit calculates the projectable region using normal information of each of the plurality of planes of the screen.

7. The image output device according to claim 1, wherein the projectable region calculating unit discretely calculates a trajectory of the laser beam projected onto the screen, and
 the generating unit generates a pixel value at a position at which the trajectory of the laser beam discretely calculated by the projectable region calculating unit is interpolated.

8. The image output device according to claim 2, further comprising:
 an information acquiring unit that acquires normal information of the screen.

9. The image output device according to claim 2, further comprising:
 an imaging unit that images an image projected onto the screen and outputs an imaged image; and
 a calculating unit that calculates normal information of the screen based on information which is included in the image and recognized from the imaged image output from the imaging unit.

10. The image output device according to claim 1, further comprising:
 a storage unit that stores the projection window set by the projection window setting unit,
 wherein the generating unit generates an image to be output to be projected onto the screen based on an image input to be projected onto the screen based on the projection window stored in the storage unit.

11. An image output method comprising:
 calculating a projectable region which is a region on a screen in which laser beam is projectable based on a trajectory in which scanning with the laser beam is performed using information specifying the screen onto which an image is projected by two-dimensional scanning with the laser beam;
 causing the laser beam to be emitted and setting a projection window serving as a range in which the image is projected in the projectable region; and
 generating a pixel value of each of positions corresponding to pixels included in the image within the projection window on the screen for each pixel in a manner that the image is projected in the range set by the projection window.

12. A controller comprising:
 a projectable region calculating unit configured to calculate a projectable region using information specifying a screen onto which an image is projected by scanning with laser beam;
 a projection window setting unit configured to set a projection window serving as a range in which the image is projected in the projectable region; and
 a generating unit configured to generate a pixel value of each of positions corresponding to pixels in a manner that the image is projected in the range set by the projection window.

13. The controller according to claim 12, wherein the projectable region calculating unit calculates the projectable region using normal information representing a direction of a normal line orthogonal to a plane of the screen as the information specifying the screen.

14. The controller according to claim 12, wherein the generating unit defines a predetermined position at which the laser beam is radiated within the projection window on the screen as a projection pixel, and generates a pixel value of the projection pixel based on pixel values of a plurality of pixels of the image around a position corresponding to the projection pixel.

15. The controller according to claim 12, further comprising:
 a laser source that generates the laser beam; and
 a scanning mirror that reflects the laser beam output from the laser source and performs two-dimensional scanning with the laser beam.

16. The controller according to claim 12, further comprising:
 an optical lens that is arranged on an optical path from the scanning mirror to the screen and corrects the optical path of the laser beam,
 wherein the projectable region calculating unit calculates the projectable region based on a trajectory of the laser beam in which influence by the optical lens is reflected.

17. The controller according to claim 13, wherein, when the screen has a plurality of planes, the projectable region calculating unit calculates the projectable region using normal information of each of the plurality of planes of the screen.

18. The controller according to claim 12,
wherein the projectable region calculating unit discretely calculates a trajectory of the laser beam projected onto the screen, and the generating unit generates a pixel value at a position at which the trajectory of the laser beam discretely calculated by the projectable region calculating unit is interpolated.

19. The controller according to claim 13, further comprising:
an information acquiring unit that acquires normal information of the screen.

20. The controller according to claim 13, further comprising:
an imaging unit that images an image projected onto the screen and outputs an imaged image; and
a calculating unit that calculates normal information of the screen based on information which is included in the image and recognized from the imaged image output from the imaging unit.

* * * * *